(12) United States Patent
Kawai

(10) Patent No.: US 8,239,450 B2
(45) Date of Patent: Aug. 7, 2012

(54) APPLICATION EXECUTING METHOD, APPLICATION CHANGING APPARATUS, AND APPLICATION CHANGING PROGRAM

(75) Inventor: Ryo Kawai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 541 days.

(21) Appl. No.: 12/540,767

(22) Filed: Aug. 13, 2009

(65) Prior Publication Data
US 2010/0223324 A1    Sep. 2, 2010

(30) Foreign Application Priority Data

Mar. 2, 2009    (JP) .................................. 2009-048131

(51) Int. Cl.
*G06F 15/16* (2006.01)
(52) U.S. Cl. ....................................................... 709/203
(58) Field of Classification Search .................. 709/224, 709/206, 203, 217; 715/206, 799, 762, 756, 715/738; 379/88.17, 88.03, 88.18, 67.1, 379/32.01, 211.04, 201.02
See application file for complete search history.

(56) References Cited

U.S. PATENT DOCUMENTS

2005/0022013 A1    1/2005   Schwenk
2008/0109483 A1*   5/2008   Yoo et al. .................... 707/104.1

FOREIGN PATENT DOCUMENTS

JP    2005-505839 A    2/2005
WO   WO 03/032552 A2   4/2003

* cited by examiner

*Primary Examiner* — Emmanuel L Moise
*Assistant Examiner* — Charles Murphy
(74) *Attorney, Agent, or Firm* — Foley & Lardner LLP

(57) ABSTRACT

In order to provide a user with an application customized according to a situation of a task, there is provided a computer system including: an application server for processing the task requested from a client; and a customization executing server for changing an application provided by the application server. The customization executing server is configured to: manage user status information including operation information of the application; record the operation information of the application in the user status information based on a request message transmitted from the client; change a response message transmitted by the application server based on the user status information to newly generate a response message; and transmit the newly-generated response message to the client.

15 Claims, 24 Drawing Sheets

251
CUSTOMIZATION DEFINING INFORMATION

| CUSTOMIZATION ID (511) | CUSTOMIZATION TARGET IDENTIFIER (512) | CUSTOMIZATION CONTENT (513) | |
|---|---|---|---|
| 100 | http://xxx.example/class_detail.html | CUSTOMIZATION CONTENT 1 | 521 |
| 101 | http://xxx.example/class_detail.html | CUSTOMIZATION CONTENT 2 | 522 |

*FIG. 5A*

252
USER STATUS DEFINING INFORMATION FOR APPLYING CUSTOMIZATION

| CUSTOMIZATION ID (531) | CUSTOMIZATION TARGET IDENTIFIER (532) | TRANSITION SOURCE IDENTIFIER CONDITION (533) | |
|---|---|---|---|
| 100 | http://xxx.example/class_detail.html | http://xxx.education/selection.html | 541 |
| 101 | http://xxx.example/class_detail.html | http://xxx.education/registration.html | 542 |

*FIG. 5B*

253
USER STATUS HISTORY INFORMATION

| CUSTOMIZATION ID (551) | TRANSITION SOURCE IDENTIFIER (552) | TRANSITION DESTINATION IDENTIFIER (553) | |
|---|---|---|---|
| 100 | http://xxx.education/selection.html | http://xxx.example/class_detail.html | 561 |

*FIG. 5C*

| USER STATUS HISTORY INFORMATION IN STEP 811 |||
| --- | --- | --- |
| ~551 | ~552 | ~553 |
| CUSTOMIZATION ID | TRANSITION SOURCE IDENTIFIER | TRANSITION DESTINATION IDENTIFIER |
| 100 | — | http://xxx.education/selection.html |

| USER STATUS HISTORY INFORMATION IN STEP 812 |||
| --- | --- | --- |
| ~551 | ~552 | ~553 |
| CUSTOMIZATION ID | TRANSITION SOURCE IDENTIFIER | TRANSITION DESTINATION IDENTIFIER |
| 100 | http://xxx.education/selection.html | http://example/class_detail.html |

| USER STATUS HISTORY INFORMATION IN STEP 813 |||
| --- | --- | --- |
| ~551 | ~552 | ~553 |
| CUSTOMIZATION ID | TRANSITION SOURCE IDENTIFIER | TRANSITION DESTINATION IDENTIFIER |
| 101 | — | http://example/registration.html |

| USER STATUS HISTORY INFORMATION IN STEP 814 |||
| --- | --- | --- |
| ~551 | ~552 | ~553 |
| CUSTOMIZATION ID | TRANSITION SOURCE IDENTIFIER | TRANSITION DESTINATION IDENTIFIER |
| 101 | http://example/registration.html | http://example/class_detail.html |

CUSTOMIZATION DEFINING INFORMATION

| CUSTOMIZATION ID ~511 | CUSTOMIZATION TARGET IDENTIFIER ~512 | CUSTOMIZATION CONTENT ~513 | |
|---|---|---|---|
| 102 | http://xxx.example/company_detail.html | CUSTOMIZATION CONTENT 1 | ~1151 |
| 103 | http://xxx.example/company_detail.html | CUSTOMIZATION CONTENT 1 | ~1152 |

USER STATUS DEFINING INFORMATION FOR APPLYING CUSTOMIZATION

| CUSTOMIZATION ID ~531 | CUSTOMIZATION TARGET IDENTIFIER ~532 | TRANSITION SOURCE IDENTIFIER CONDITION ~533 | TRANSITION SOURCE STRUCTURE CONDITION ~1111 | |
|---|---|---|---|---|
| 102 | http://xxx.example/company_detail.html | http://example/company_list.html | /html/group/label=Area | 1131 |
| 103 | http://xxx.example/company_detail.html | http://example/company_list.html | /html/group/label=Rank | 1132 |

USER STATUS HISTORY INFORMATION

| CUSTOMIZATION ID ~551 | TRANSITION SOURCE IDENTIFIER ~552 | TRANSITION DESTINATION IDENTIFIER ~553 | SELECTED STRUCTURE ~1121 | |
|---|---|---|---|---|
| 102 | http://example/company_list.html | http://xxx.example/company_detail.html | /html/group/label=Area | 1141 |

*FIG. 14C*

| | USER STATUS HISTORY INFORMATION | | | |
|---|---|---|---|---|
| ~551 | ~552 | ~553 | ~1121 | ~1511 |
| CUSTOMIZATION ID | TRANSITION SOURCE IDENTIFIER | TRANSITION DESTINATION IDENTIFIER | SELECTED STRUCTURE | |
| 102 | — | http://example/company_list.html | — | |
| 103 | — | http://example/company_list.html | — | |

*FIG. 18A*

| | USER STATUS HISTORY INFORMATION | | | |
|---|---|---|---|---|
| ~551 | ~552 | ~553 | ~1121 | ~1512 |
| CUSTOMIZATION ID | TRANSITION SOURCE IDENTIFIER | TRANSITION DESTINATION IDENTIFIER | SELECTED STRUCTURE | |
| 102 | http://example/company_list.html | http://xxx.example/company_detail.html | /html/group/label=Area | |
| 103 | http://example/company_list.html | http://xxx.example/company_detail.html | — | |

*FIG. 18B*

| | USER STATUS HISTORY INFORMATION | | | |
|---|---|---|---|---|
| ~551 | ~552 | ~553 | ~1121 | ~1513 |
| CUSTOMIZATION ID | TRANSITION SOURCE IDENTIFIER | TRANSITION DESTINATION IDENTIFIER | SELECTED STRUCTURE | |
| 102 | — | http://example/company_list.html | — | |
| 103 | — | http://example/company_list.html | — | |

*FIG. 18C*

| | USER STATUS HISTORY INFORMATION | | | |
|---|---|---|---|---|
| ~551 | ~552 | ~553 | ~1121 | ~1514 |
| CUSTOMIZATION ID | TRANSITION SOURCE IDENTIFIER | TRANSITION DESTINATION IDENTIFIER | SELECTED STRUCTURE | |
| 102 | http://example/company_list.html | http://xxx.example/company_detail.html | — | |
| 103 | http://example/company_list.html | http://xxx.example/company_detail.html | /html/group/label=Rank | |

CUSTOMIZATION DEFINING INFORMATION ~251

| CUSTOMIZATION ID ~511 | CUSTOMIZATION TARGET IDENTIFIER ~512 | CUSTOMIZATION CONTENT ~513 |
|---|---|---|
| 104 | http://xxx.example/company_detail.html | CUSTOMIZATION CONTENT 4 |
| 105 | http://xxx.example/company_detail.html | CUSTOMIZATION CONTENT 5 |

FIG. 19B

USER STATUS DEFINING INFORMATION FOR APPLYING CUSTOMIZATION ~252

| CUSTOMIZATION ID ~531 | CUSTOMIZATION TARGET IDENTIFIER ~532 | TRANSITION SOURCE IDENTIFIER CONDITION ~533 | QUERY IDENTIFIER ~1611 |
|---|---|---|---|
| 104 | http://xxx.example/company_detail.html | http://example/company_list.html | target=Area |
| 105 | http://xxx.example/company_detail.html | http://example/company_list.html | target=Rank |

USER STATUS HISTORY INFORMATION ~253

| CUSTOMIZATION ID ~551 | TRANSITION SOURCE IDENTIFIER ~552 | TRANSITION DESTINATION IDENTIFIER ~553 | QUERY IDENTIFIER ~1621 |
|---|---|---|---|
| 104 | http://example/company_list.html | http://xxx.example/company_detail.html | target=Area |

1641

APPLICATION EXECUTING METHOD, APPLICATION CHANGING APPARATUS, AND APPLICATION CHANGING PROGRAM

CLAIM OF PRIORITY

The present application claims priority from Japanese patent application JP 2009-048131 filed on Mar. 2, 2009, the content of which is hereby incorporated by reference into this application.

BACKGROUND OF THE INVENTION

This invention relates to a technology of providing an application customized according to a flow of a task.

In recent years, the business environment has been changing drastically, and hence there arises a need to build an application promptly in response to the change. However, it is difficult to predict the change in the business environment prior to building an application. In view of this, there has been a demand that an application be changed promptly in response to the change in the business environment.

In a case where an application is changed with a conventional technology, a development project is first set up, and then led by an information system department or a system integrator who is specialized in building an application. For this reason, it has been difficult to change an application promptly in response to the change in the business environment.

In a case where the information system department or the system integrator changes an application, the application is built based on an opinion and a demand of a user who is actually to carry out the task. However, instead of from a viewpoint of the user who is actually to carry out the task, in some cases, the application is built from a viewpoint of the information system department or the system integrator, or from a viewpoint of a primary department responsible for conducting the final processing of the task. Hence, there occurs a case in which the user who is actually to carry out the task cannot use the application efficiently.

In view of such circumstances, there is proposed a technology in which, without relying on the information system department or the system integrator, the user who is actually to carry out the task changes the application promptly in response to the change in task and executes the application. A typical example of such a technology in which a user changes an application according to the purpose of a task includes mashup. The mashup is a method of creating a new application by associating information pieces provided by a plurality of different applications with one another. For example, an application that provides map information and an application that provides information on real estate properties are combined, whereby an application that provides a new real estate service is created.

In a conventional application changing method as typified by the mashup, a uniform resource locator (URL) that indicates the locational information of a window to be provided by an application is associated with customization defining information in which a change content of the application is described. The customization defining information is a file in which the URL of a window provided by an application to be changed and an application changing method are defined. The application changing method includes, for example, a method of adding information provided by a given application to a window of the application to be changed, and a method of adding a new processing program to the application to be changed. When a URL described in the customization defining information is accessed, an application that has been changed based on the customization defining information is executed.

A publicly-known example of the above-mentioned conventional customization methods is disclosed in, for example, JP 2005-505839 A. In JP 2005-505839 A, there is disclosed a technology in which change information previously associated with a user identifier is applied to response information and the resultant is provided to the user in a case where an access is made to the URL of a window provided by an application on a network.

SUMMARY OF THE INVENTION

However, in the technology disclosed in JP 2005-505839 A, a change content of the application is associated with the user and the URL, and hence, in a case where the same user uses the same application for another task, it is impossible to perform customization according to the task.

Here, description is given by taking, as an example, an education support system that supports selecting an education subject and accepting a registration therefor. The education support system provides a user with a window that displays a list of education subjects, a window that displays detailed information of an education subject, and a window for education subject registration. In addition, as other systems associated with the education support system, a scheduler application that displays a user's schedule and an application that displays feedback from a person who has attended the education subject before are available.

In the education support system described above, the following situations are conceivable when a user uses the window that displays the detailed information of an education subject:

(1) a situation in which, in selecting an education subject that the user desires to attend via the window that displays the list of education subjects, the user uses the window that displays the detailed information of the education subject so that the user can decide whether or not to attend the education subject which the user is interested in; and (2) a situation in which, in making a registration for an education subject which the user desires to attend via the window for education subject registration, the user uses the window that displays the detailed information of the subject in order to decide on attendance dates.

In the two situations described above, the user has different purposes in using the window that displays the details of the subject, and hence information that the user wants to check in association with the detailed information of the subject is expected to be different between the two situations.

Specifically, in selecting an education subject that the user desires to attend, it is conceivable that the user checks, along with the detailed information of the subject, the feedback of the students who have attended the same education subject before. On the other hand, in making a registration for an education subject, it is conceivable that the user checks, along with the detailed information of the subject, the schedule of the user.

However, with the technology disclosed in JP 2005-505839 A, the customization defining information is associated simply based on the URL of a window that displays the details of an education subject. Accordingly, as a result of customization of the application, a window displaying the detailed information of a subject, the students' feedback, and the user's scheduler is provided regardless of the situation in which the education support system is used.

Consequently, in a case where the user uses the education support system, according to the situation in which the user uses the education support system, the user is required to search for necessary information and make a choice by himself/herself from the window in which the detailed information of a subject, the students' feedback, and the user's scheduler are combined.

It is an object of this invention to provide a technology of providing a function customized according to a situation in which an application is used.

The representative aspects of this invention are as follows. That is, there is provided an application executing method used for a computer system comprising: an application server for receiving a request from a client and providing an application for processing a task; and a customization executing server for changing a particular application included in the application and providing the changed particular application to the client, the customization executing server comprising: an interface coupled to the client and the application server; a processor coupled to the interface; and a memory accessible from the processor, the memory storing: user status information including operation information of the application for processing the task and the particular application; user status defining information for applying customization in which the operation information of the application executed before the particular application is requested to perform processing is defined as a condition for changing the particular application; and customization defining information in which a customization content for the particular application is defined, the application executing method including the steps of: receiving, by the customization executing server, a request message including a request for executing the application and the particular application from the client in a case where the client makes a request for the processing to the application and the particular application in order to process the task; analyzing, by the customization executing server, the received request message to identify the operation information of the application and the particular application; recording, by the customization executing server, based on the user status defining information for applying customization, the identified operation information in the user status information; transmitting, by the customization executing server, the request message to the application server; executing, by the application server, based on the request message, the processing for which the request is made; transmitting, by the application server, a response message corresponding to the request message; receiving, by the customization executing server, the response message transmitted by the application server; judging, by the customization executing server, based on the user status defining information for applying customization and the user status information, which step of a process of processing the task is to be customized, and determining whether or not to change the particular application; changing, by the customization executing server, in a case where the particular application is changed, the response message based on the customization defining information to newly generate a response message; and transmitting, by the customization executing server, the newly-generated response message to the client.

According to the one aspect of this invention, it is possible to provide the user with an application customized according to the situation of the task.

BRIEF DESCRIPTION OF THE DRAWINGS

The present invention can be appreciated by the description which follows in conjunction with the following figures, wherein:

FIG. 5A is an explanatory diagram illustrating an example of a customization defining information according to the first embodiment of this invention;

FIG. 5B is an explanatory diagram illustrating an example of a user status defining information for applying customization according to the first embodiment of this invention;

FIG. 5C is an explanatory diagram illustrating an example of a user status history information according to the first embodiment of this invention;

FIGS. 10A to 10D are explanatory diagrams for illustrating examples of user status history information according to the first embodiment of this invention;

FIG. 14A is an explanatory diagram illustrating an example of a customization defining information according to a second embodiment of this invention;

FIG. 14B is an explanatory diagram illustrating an example of a user status defining information for applying customization according to the second embodiment of this invention;

FIG. 14C is an explanatory diagram illustrating an example of a user status history information according to the second embodiment of this invention;

FIGS. 18A to 18D are explanatory diagrams for illustrating examples of user status history information according to the second embodiment of this invention;

FIG. 19A is an explanatory diagram illustrating an example of a customization defining information according to a third embodiment of this invention;

FIG. 19B is an explanatory diagram illustrating an example of a user status defining information for applying customization according to the third embodiment of this invention;

FIG. 19C is an explanatory diagram illustrating an example of a user status history information according to the third embodiment of this invention;

DETAILED DESCRIPTION OF THE PREFERRED EMBODIMENTS

Figure 1:
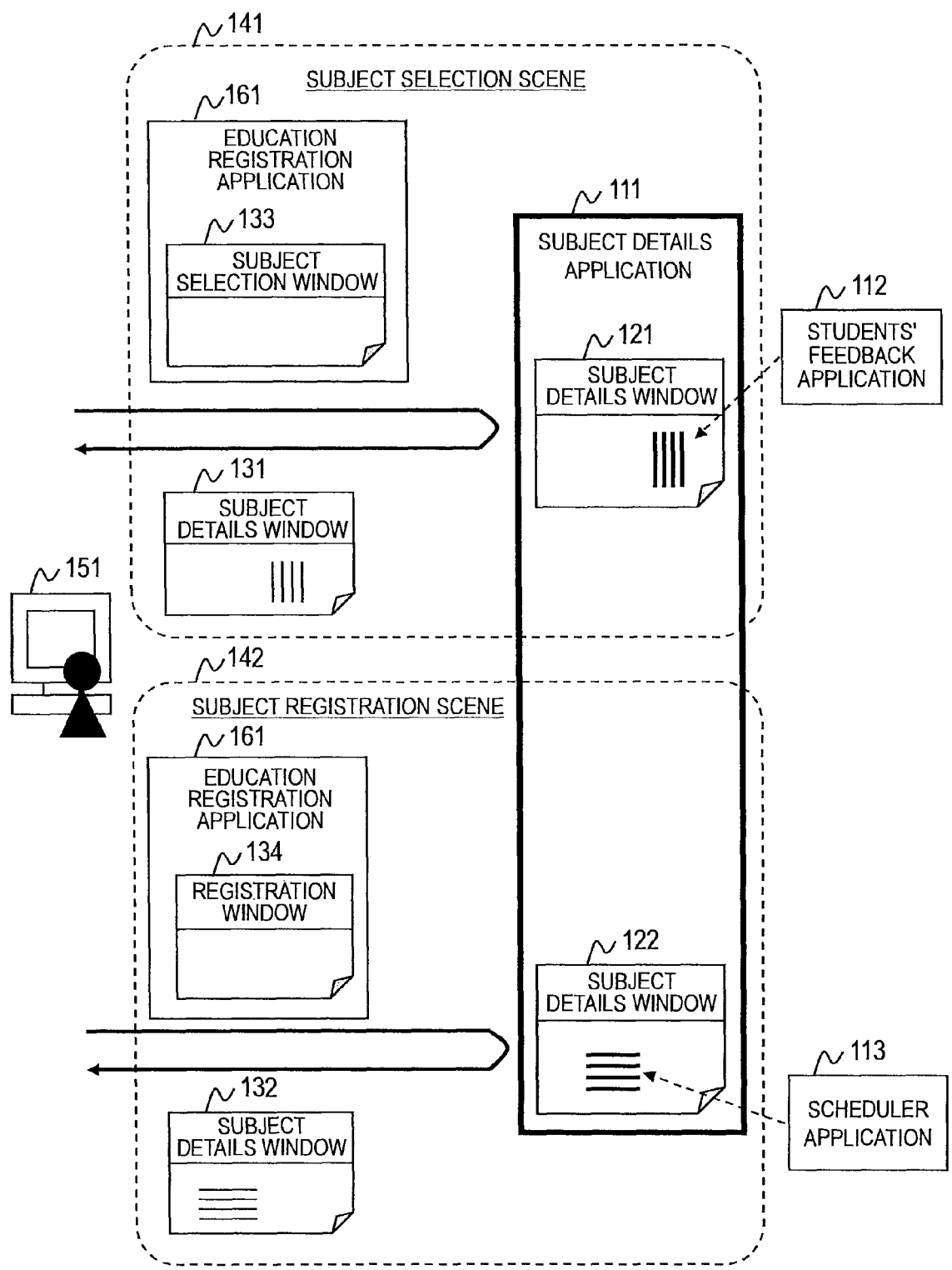
FIG. 1 is a diagram for describing an outline of operation of an application according to a first embodiment of this invention.

Hereinbelow, referring to the drawings, detailed description is given of embodiments of this invention.

First Embodiment

<Outline>

First, taking the above-mentioned education support system as an example, description is given of operation of an application to which this invention is applied.

FIG. 1 is a diagram for describing the outline of operation of an application according to a first embodiment of this invention.

The education support system illustrated in FIG. 1 includes a subject details application 111, an education registration application 161, a students' feedback application 112, and a scheduler application 113. Each of the applications is executed in response to a request made from a user via a client 151.

In the education support system to which the first embodiment of this invention is applied, when the user executes the subject details application 111 via the client 151, a window to be displayed is customized based on a situation in which the subject details application 111 is executed.

For example, in a case of a subject selection scene 141 in which a subject details window 121 is referred to from a subject selection window 133 for selecting an education subject, the subject details window 121 provided by the subject details application 111 is combined with information of the students' feedback application 112. Then, a subject details window 131 in which the information of the subject details and the information of the students' feedback are combined is displayed on the client 151.

On the other hand, in a case of a subject registration scene 142 in which a subject details window 122 is referred to from a registration window 134 for education subject registration, the subject details window 122 provided by the subject details application 111 is combined with information of the scheduler application 113. Then, a subject details window 132 in which the information of the subject details and the schedule of the user are combined is displayed on the client 151.

As described above, according to the first embodiment of this invention, in a case where the user uses the subject details application 111, it becomes possible for the user to use the subject details application 111 customized according to whether the situation is for selecting a subject or for making a registration for a subject.

Hereinbelow, referring to FIGS. 2 to 10D, description is given of an application executing method according to the first embodiment of this invention. In the first embodiment of this invention, description is given mainly of a situation in which this invention is applied to a Web application.

<System Configuration>

Figure 2:
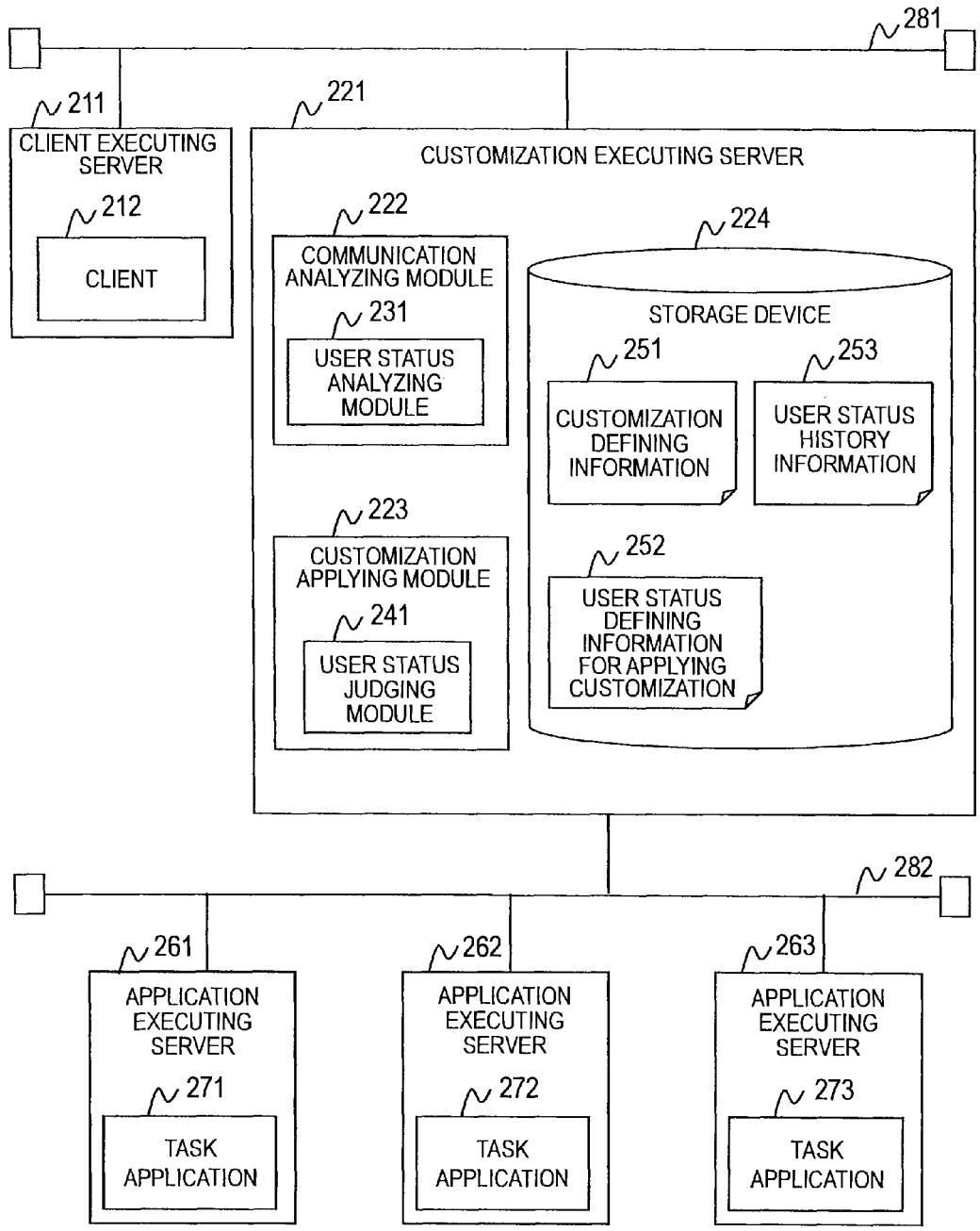
FIG. 2 is a block diagram illustrating an example of a configuration of a computer system according to the first embodiment of this invention.

FIG. 2 is a block diagram illustrating an example of a configuration of a computer system according to the first embodiment of this invention.

The computer system that implements the application executing method according to the first embodiment of this invention includes a client executing server 211, a customization executing server 221, and application executing servers 261, 262, and 263.

The client executing server 211 and the customization executing server 221 are coupled to each other via a network 281. Further, the customization executing server 221 and the application executing servers 261, 262, and 263 are coupled to one another via a network 282. The client executing server 211 accesses the application executing servers 261, 262, and 263 via the customization executing server 221.

The network 281 and the network 282 may be local area networks (LANs), or may be global networks such as wide area networks (WANs) or the Internet. Further, the network 281 and the network 282 may be the same network.

The client executing server 211 includes a client 212. The client 212 is a program which transmits/receives messages to/from the application executing servers 261, 262, and 263 via the customization executing server 221. Based on a message received from the customization executing server 221, the client executing server 211 displays a window including requested information.

The customization executing server 221 includes a communication analyzing module 222, a customization applying module 223, and a storage device 224.

The communication analyzing module 222 includes a user status analyzing module 231. In order to apply a customization to an application according to the status, the communication analyzing module 222 and the user status analyzing module 231 analyze the status of the application, such as an operation made by the user. Details of processing performed by the communication analyzing module 222 and the user status analyzing module 231 are described later with reference to FIG. 6.

The customization applying module 223 includes a user status judging module 241. The user status judging module 241 judges a result of analysis made by the communication analyzing module 222 and the user status analyzing module 231. Based on a result of judgment made by the user status judging module 241 as to the status of the user, the customization applying module 223 customizes the application. Details of processing performed by the customization applying module 223 and the user status judging module 241 are described later with reference to FIG. 7.

The storage device 224 stores customization defining information 251, user status defining information for applying customization 252, and user status history information 253.

The customization defining information 251 is such information that defines identification information of a customization target window and the corresponding customization content. Details of the customization defining information 251 are described later with reference to FIG. 5A.

The user status defining information for applying customization 252 is such information that defines a condition for customizing a window. Details of the user status defining information for applying customization 252 are described later with reference to FIG. 5B.

The user status history information 253 is a history of access made to applications by the user. In a Web system, a history of access to windows corresponds to the user status history information 253, in which a window of a transition source and a window of a transition destination are stored. Details of the user status history information 253 are described later with reference to FIG. 5C.

The application executing server 261 executes a task application 271. Similarly, the application executing server 262 executes a task application 272. Further, the application executing server 263 executes a task application 273.

The task applications 271, 272, and 273 execute processing requested from the client executing server 211 via the customization executing server 221, and return results of the processing.

Figure 3:
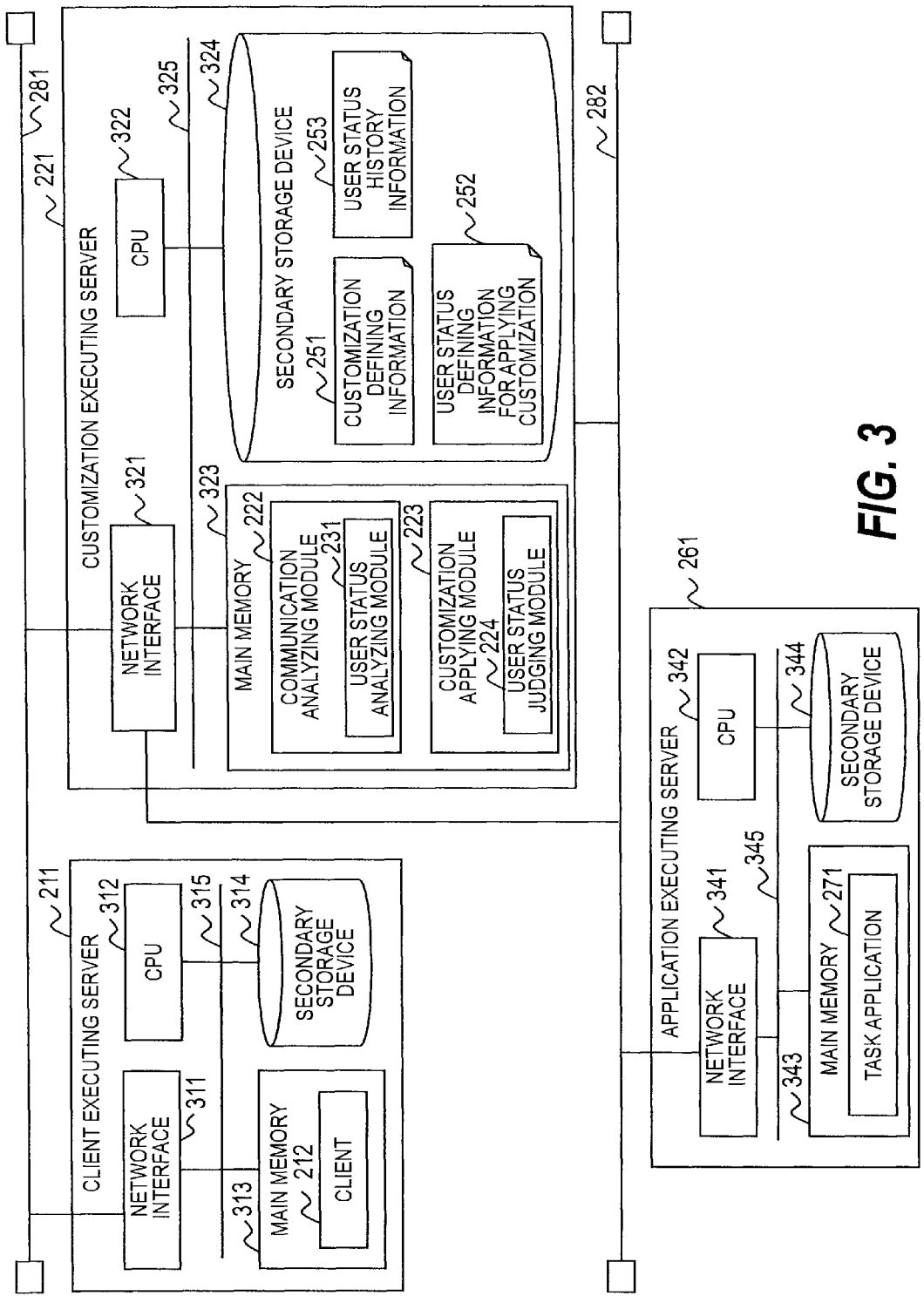
FIG. 3 is an explanatory diagram illustrating an example of hardware configurations of a client executing server, a customization executing server, and an application executing server according to the first embodiment of this invention.

FIG. 3 is a diagram illustrating an example of hardware configurations of the client executing server 211, the customization executing server 221, and the application executing server 261 according to the first embodiment of this invention.

It should be noted that hardware configurations of the application executing servers 262 and 263 are the same as the hardware configuration of the application executing server 261, and hence description thereof is omitted.

The client executing server 211 includes a CPU 312, a network interface 311, a secondary storage device 314, and a main memory 313. The CPU 312, the network interface 311, the secondary storage device 314, and the main memory 313 are coupled to one another via a bus 315.

The CPU 312 executes a program stored in the main memory 313 to thereby implement a predetermined function of the client executing server 211.

The network interface 311 is an interface for coupling to the network 281. The client executing server 211 is coupled to the network 281 via the network interface 311.

The secondary storage device 314 stores programs and data necessary for executing the client 212 and other processing. The secondary storage device 314 is, for example, a magnetic storage medium such as a hard disk drive. Alternatively, the secondary storage device 314 may be a semiconductor storage medium such as a flash memory.

The main memory 313 stores programs to be executed by the CPU 312 and data necessary for executing the programs. For example, the main memory 313 stores the client 212, which is a program for implementing a client function. In addition, the main memory 313 stores an operating system (OS) and the like. It should be noted that, for the sake of simplification, the illustration of the OS is omitted. The main memory 313 is, for example, a random access memory (RAM).

Further, though a subject responsible for executing the client 212 is the CPU 312, hereinbelow, to make the description simple, the description is given assuming that the client 212 is a subject responsible for the operation or the processing.

Further, as another embodiment of this invention, the client 212 may be implemented by hardware that includes a logic circuit for implementing the function of the client 212. In this case, the client 212 is the subject responsible for the operation or the processing.

The customization executing server 221 includes a CPU 322, a network interface 321, a secondary storage device 324, and a main memory 323. The CPU 322, the network interface 321, the secondary storage device 324, and the main memory 323 are coupled to one another via a bus 325.

The CPU 322 executes a program stored in the main memory 323 to thereby implement a predetermined function of the customization executing server 221.

The network interface 321 is an interface for coupling to the network 281 and the network 282. The customization executing server 221 is coupled to the network 281 and the network 282 via the network interface 321.

The secondary storage device 324 stores programs and data necessary for implementing a predetermined function of the customization executing server 221. The secondary storage device 324, which corresponds to the storage device 224 illustrated in FIG. 2, stores information such as the customization defining information 251, the user status defining information for applying customization 252, and the user status history information 253. The secondary storage device 324 is, for example, a magnetic storage medium such as a hard disk drive. Alternatively, the secondary storage device 324 may be a semiconductor storage medium such as a flash memory.

The main memory 323 stores programs to be executed by the CPU 322 and data necessary for executing the programs. For example, the main memory 323 stores the communication analyzing module 222 and the customization applying module 223. In addition, the main memory 323 stores an OS (not shown) and the like as in the case of the client executing server 211. The main memory 323 is, for example, a RAM.

As described above, the customization executing server 221 includes the communication analyzing module 222, the customization applying module 223, the user status analyzing module 231, and the user status judging module 241. Each of the functional blocks (the communication analyzing module 222, the customization applying module 223, the user status analyzing module 231, and the user status judging module 241) is provided with a predetermined function by the CPU 322 executing a program for implementing each of the functional blocks, which is stored in the main memory 323. In this case, though a subject responsible for the operation or the processing of each of the functional blocks is the CPU 322, hereinbelow, to make the description simple, the description is given assuming that each of the functional blocks is the subject responsible for the operation or the processing.

Further, as another embodiment of this invention, each of the functional blocks of the customization executing server 221 may be implemented by hardware that includes a logic circuit and the like for implementing each function. In this case, each of the functional blocks is the subject responsible for the operation or the processing.

The application executing server 261 includes a CPU 342, a network interface 341, a secondary storage device 344, and a main memory 343. The CPU 342, the network interface 341, the secondary storage device 344, and the main memory 343 are coupled to one another via a bus 345.

The CPU 342 executes the program (task application 271) stored in the main memory 343 to thereby implement a predetermined function of the application executing server 261.

The network interface 341 is an interface for coupling to the network 282. The application executing server 261 is coupled to the network 282 via the network interface 341.

The secondary storage device 344 stores programs and data necessary for executing the task application 271 and other processing. The secondary storage device 344 is, for example, a magnetic storage medium such as a hard disk drive. Alternatively, the secondary storage device 314 may be a semiconductor storage medium such as a flash memory.

The main memory 343 stores programs to be executed by the CPU 342 and data necessary for executing the programs. For example, the main memory 343 stores the task application 271, the OS (not shown), and the like. The main memory 343 is, for example, a RAM.

Further, though a subject responsible for executing the task application 271 is the CPU 342, hereinbelow, to make the description simple, the description is given assuming that the task application 271 is a subject responsible for the operation or the processing.

Further, as another embodiment of this invention, the task application 271 may be implemented by hardware or the like that includes a logic circuit for implementing the function of the task application 271. In this case, the task application 271 is the subject responsible for the operation or the processing.

It should be noted that the configurations of the client executing server 211, the customization executing server 221, and the application executing server 261 are not limited to the configurations illustrated in FIG. 3. For example, the customization executing server 221 may be configured on the same computer as that of the client executing server 211. Further, the application executing server 261 may be configured to execute a plurality of task applications.

<Content of Each Piece of Definition Information>

Here, description is given of details of definition information used in an application executing system according to the first embodiment of this invention. Specifically, description is given of the customization defining information 251, the user status defining information for applying customization 252, and the user status history information 253, which are stored in the customization executing server 221.

FIG. 5A is a diagram illustrating an example of the customization defining information 251 according to the first embodiment of this invention.

In the customization defining information 251, identification information of a customization target window and a customization content are stored in association with each other. The customization defining information 251 includes a customization ID 511, a customization target identifier 512, and a customization content 513.

The customization ID 511 is an identifier for identifying the customization defining information, that is, a combination of a customization target and a customization content.

The customization target identifier 512 is an identifier of a window provided by a change target application. For example, in the Web system, a URL, which is locational information of the window, is stored.

The customization content 513 is a specific change content of a window provided by an application. The change content of a window provided by an application is, for example, the locational information (URL) of another application that is to be added to the change target application. Further, the customization content 513 includes positional information for arranging, in the window of the change target application, the information of the application to be added. Further, the customization content 513 may include process information for combining the information provided by the change target application and the information provided by the application to be added. It is possible to describe, in the process information, processing performed by a general program, such as a numerical computation, a character string operation, or a branch process.

A row 521 of the customization defining information 251 shows that, when the user accesses a window associated with change target locational information "http://xxx.example/class_detail.html", which is provided by the application, a "customization content 1" is applied to the change target window.

FIG. 5B is a diagram illustrating an example of the user status defining information for applying customization 252 according to the first embodiment of this invention.

In the user status defining information for applying customization 252, there is stored a condition for applying the customization content defined in each row of the customization defining information 251. The user status defining information for applying customization 252 includes a customization ID 531, a customization target identifier 532, and a transition source identifier condition 533.

The customization ID 531 is an identifier for identifying the customization defining information. The customization ID 531 corresponds to the customization ID 511 of the customization defining information 251.

The customization target identifier 532 is the identifier of a window provided by a change target application. Similarly to the customization ID 511 of the customization defining information 251, in the Web system, a URL, which is locational information of the window, is stored.

The transition source identifier condition 533 is an identifier for identifying a transition source that has been accessed before the change target application is accessed. In the case of the Web system, a URL, which is the locational information of the transition source window, is stored.

A row 541 of the user status defining information for applying customization 252 shows that, in a case where the user has accessed a window associated with locational information "http://xxx.education/selection.html" before accessing a window associated with change target locational information "http://xxx.example/class_detail.html" provided by the application, a customization content identified by the customization ID 531 is applied.

It should be noted that a plurality of transition source applications may be set in the transition source identifier condition 533. For example, by setting values that link the locational information of the plurality of transition source applications in order of execution, it is possible to specify an order in which the transition source applications are executed.

FIG. 5C is a diagram illustrating an example of the user status history information 253 according to the first embodiment of this invention.

The user status history information 253 is a history of applications that have been executed or operated by the user. For example, in the Web system, the user status history information 253 corresponds to a history of window transition, and stores the URL of a transition source window and the URL of a transition destination window.

The user status history information 253 includes a customization ID 551, a transition source identifier 552, and a transition destination identifier 553.

The customization ID 551 is an identifier for identifying the customization defining information. The customization ID 551 corresponds to the customization ID 511 of the customization defining information 251.

The transition source identifier 552 is the identifier of a window that has been accessed by the user immediately before the current window. The transition destination identifier 553 is the identifier of a window that is currently accessed by the user. In the case of the Web system, the locational information (URL) of a window is stored as each of the transition source identifier 552 and the transition destination identifier 553.

A row 561 of the user status history information 253 shows that the user is currently accessing a window associated with a transition destination identifier "http://xxx.example/class_detail.html" and that the user has accessed a window associated with a transition source identifier "http://xxx.education/selection.html" immediately before the current window.

The customization defining information 251, the user status defining information for applying customization 252, and the user status history information 253 are associated with one another by means of the customization ID. As described above, the customization ID 511 of the customization defining information 251, the customization ID 531 of the user status defining information for applying customization 252, and the customization ID 551 of the user status history information 253 are associated with one another.

<Flow of Processing Performed by Communication Analyzing Module>

Next, description is given of processing procedures performed by the communication analyzing module 222.

Figure 6:
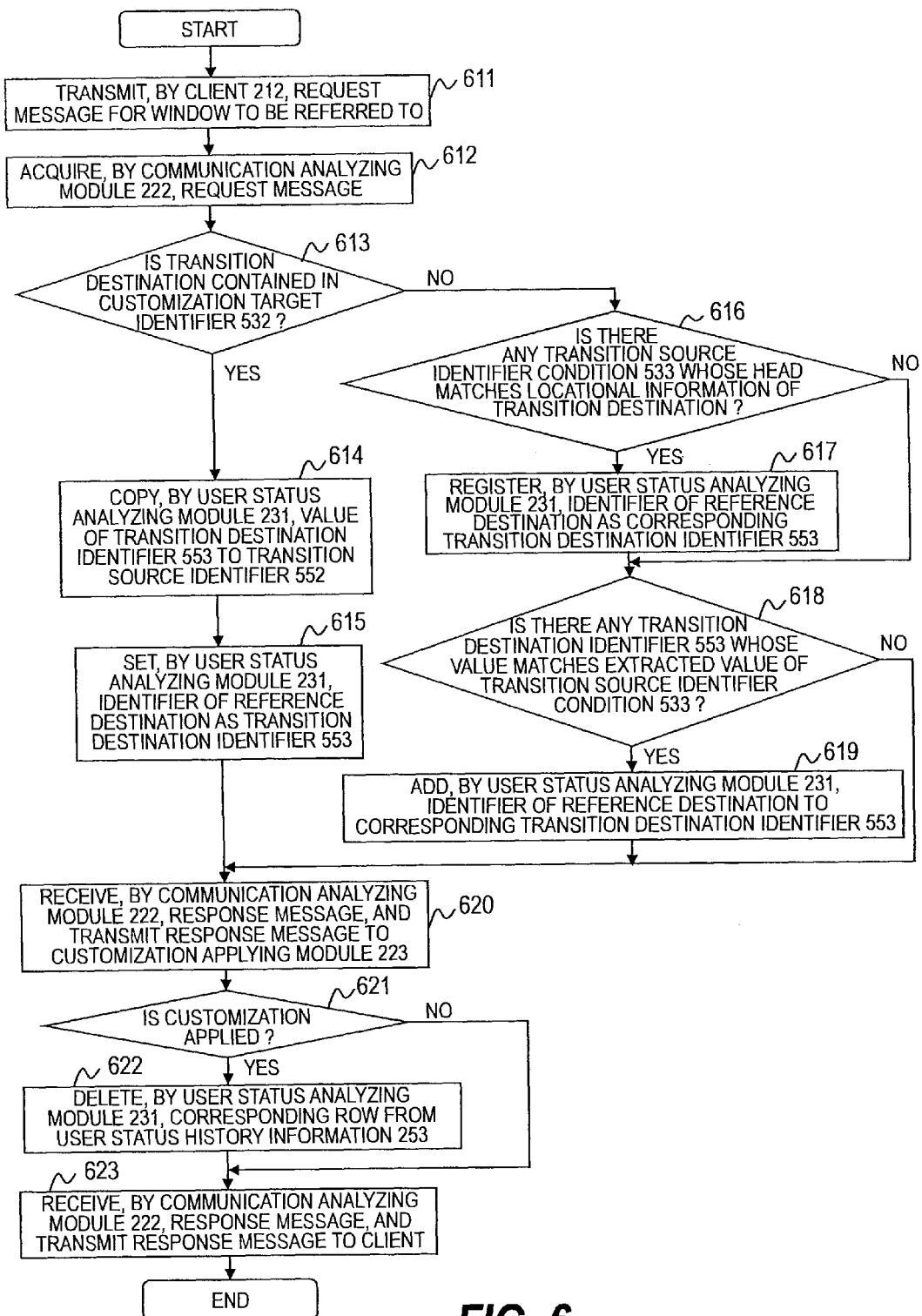
FIG. 6 is a flow chart illustrating processing procedures performed by a communication analyzing module according to the first embodiment of this invention.

FIG. 6 is a flow chart illustrating processing procedures performed by the communication analyzing module 222 according to the first embodiment of this invention.

Here, according to the first embodiment of this invention, the user status defining information for applying customization 252 and the user status history information 253 used by the communication analyzing module 222 are read from the secondary storage device 324 at a timing at which the customization executing server 221 is activated, and then stored in the main memory 323.

The client executing server 211 transmits, to the customization executing server 221, a request message for acquiring a window requested by the user via the client 212 (Step 611).

The customization executing server 221 receives, by using the communication analyzing module 222, the request message transmitted from the client executing server 211 through the processing of Step 611 (Step 612). The communication analyzing module 222 analyzes the received request message, and then acquires the locational information of the transition destination. For example, in a case where hypertext transfer protocol (HTTP) communication is performed between the client 212 and the application, the locational information of the transition destination can be acquired by acquiring a request uniform resource identifier (URI) parameter that is set in a request row included in the request message.

The user status analyzing module 231 searches the user status defining information for applying customization 252 for a row in which the locational information of the transition destination acquired in the processing of Step 612 is set in the customization target identifier 532 (Step 613).

In a case where a row in which the locational information of the transition destination is set in the customization target identifier 532 is retrieved (the result of Step 613 is "YES"), the user status analyzing module 231 executes processing of Step 614. On the other hand, in a case where a row in which the locational information of the transition destination is set in the customization target identifier 532 is not retrieved (the result of Step 613 is "NO"), the user status analyzing module 231 executes processing of Step 616.

The user status analyzing module 231 acquires the customization ID 531 from the row retrieved in the processing of Step 613, and then searches the user status history information 253 for a row including the same value in the customization ID 551. Then, the user status analyzing module 231 copies the value of the transition destination identifier 553 of the retrieved row to the transition source identifier 552 (Step 614).

The user status analyzing module 231 sets the locational information of the transition destination acquired in the processing of Step 612 in the transition destination identifier 553 of the row retrieved in the processing of Step 614 (Step 615).

The user status analyzing module 231 searches the user status defining information for applying customization 252 for a row including the transition source identifier condition 533 whose head matches the locational information of the transition destination acquired in the processing of Step 612 (Step 616).

In a case where a row including the transition source identifier condition 533 whose head matches the locational information of the transition destination is retrieved (the result of Step 616 is "YES"), the user status analyzing module 231 secures an area for adding a new row to the user status history information 253. Then, the user status analyzing module 231 sets the customization ID 531 of the row retrieved in the processing of Step 616 as the customization ID 551 to register a new row in the user status history information 253 (Step 617). Further, the user status analyzing module 231 sets the locational information of the transition destination acquired in the processing of Step 612 in the transition destination identifier 553 of the newly registered row.

On the other hand, in a case where a row including the transition source identifier condition 533 whose head matches the locational information of the transition destination is not retrieved (the result of Step 616 is "NO"), the user status analyzing module 231 executes processing of Step 618.

The user status analyzing module 231 judges whether or not the user status defining information for applying customization 252 includes a row whose transition source identifier condition 533 includes the locational information of the transition destination acquired in the processing of Step 612. Further, the user status analyzing module 231 extracts, from the transition source identifier condition 533, locational information that is earlier in execution order than the locational information of the transition destination, and then judges whether or not the user status history information 253 includes a row whose transition destination identifier 553 matches the extracted locational information (Step 618).

In a case where the condition of Step 618 is satisfied (the result of Step 618 is "YES"), the user status analyzing module 231 adds the locational information of the transition destination acquired in the processing of Step 612 to the transition destination identifier 553 of the row of the user status history information 253 acquired in the processing of Step 618 (Step 619).

In a case where the condition of Step 618 is not satisfied (the result of Step 618 is "NO") or in a case where the execution of processing of Step 619 is completed, the user status analyzing module 231 executes processing of Step 620.

The communication analyzing module 222 transmits the request message transmitted by the client 212 to the application executing server associated with the locational information of the transition destination acquired in the processing of Step 612. Then, the communication analyzing module 222 receives a response message from the application executing server, and then transmits the response message to the customization applying module 223 (Step 620). The customization applying module 223 applies a customization content associated with the response message as needed, and then transmits a response message to the communication analyzing module 222.

The communication analyzing module 222 refers to the response message received from the customization applying module 223 to judge whether or not the customization is applied to the response message (Step 621). In a case where a customization is applied (the result of Step 621 is "YES"), based on the customization ID 551 associated with the customization target identifier 512 acquired in the processing of Step 613, the user status analyzing module 231 deletes the corresponding row of the user status history information 253 (Step 622).

In a case where the customization is not applied to the response message (the result of Step 621 is "NO") or in a case where the processing of Step 622 is finished, the communication analyzing module 222 transmits the response message received in the processing of Step 620 to the client 212 (Step 623).

<Flow of Processing Performed by Customization Applying Module>

Next, description is given of processing procedures performed by the customization applying module 223.

Figure 7:
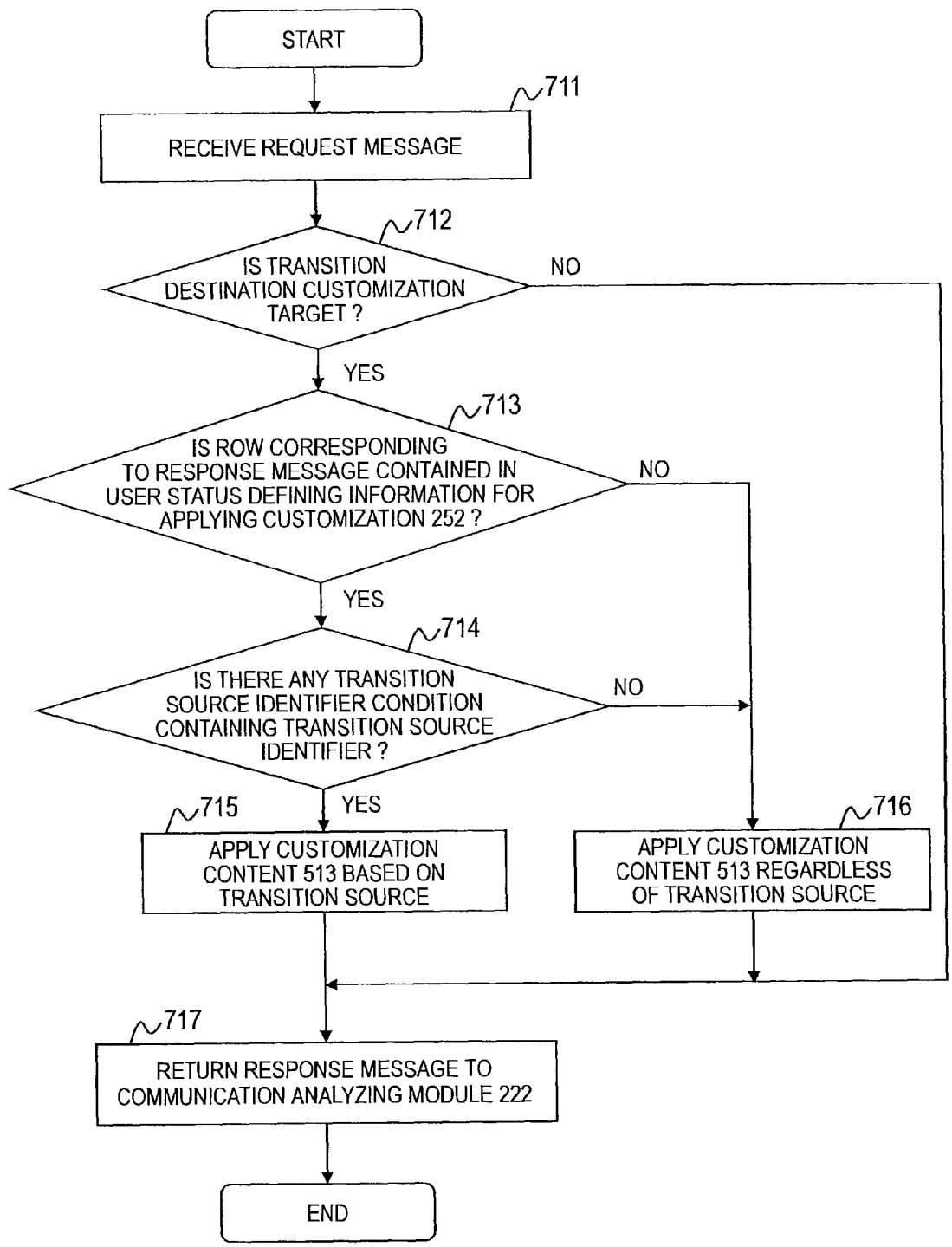
FIG. 7 is a flow chart illustrating the processing procedures performed by a customization applying module according to the first embodiment of this invention.

FIG. 7 is a flow chart illustrating the processing procedures performed by the customization applying module 223 according to the first embodiment of this invention.

Here, according to the first embodiment of this invention, the customization defining information 251, the user status defining information for applying customization 252, and the user status history information 253 used by the customization applying module 223 are read from the secondary storage device 324 at a timing at which the customization executing server 221 is activated, and then stored in the main memory 323.

The customization applying module 223 first receives a request message transmitted from the communication analyzing module 222 (Step 711).

The user status judging module 241 judges whether or not the customization defining information 251 includes a row whose customization target identifier 512 matches the transition destination identifier 553 of the user status history information 253 (Step 712). In a case where there is no applicable row in the customization defining information 251 (the result of Step 712 is "NO"), the user status judging module 241 transmits the received request message to the communication analyzing module 222 as a response message (Step 717).

In a case where there is an applicable row in the customization defining information 251 (the result of Step 712 is "YES"), the user status judging module 241 acquires the customization ID 511 associated with the value of the customization target identifier 512. Then, based on the customization ID 511 acquired in the processing of Step 712, the user status judging module 241 searches the user status defining information for applying customization 252 (Step 713).

In a case where a row is retrieved from the user status defining information for applying customization 252 (the result of Step 713 is "YES"), the user status judging module 241 judges whether or not the retrieved transition source identifier condition 533 matches any value of the transition source identifier 552 of the user status history information 253 (Step 714).

In a case where the retrieved transition source identifier condition 533 matches a value of the transition source identifier 552 of the user status history information 253 (the result of Step 714 is "YES"), the customization applying module 223 applies the customization content 513 of the row of the customization defining information 251 acquired in the processing of Step 712 to the request message transmitted from the communication analyzing module 222, and then creates a response message (Step 715). It should be noted that the processing of applying the customization content 513 to the response message can be realized by using a conventional technology such as XML stylesheet language transformations (XSLT) or pop-up, and hence detailed description of the processing is omitted.

In a case where no applicable row is retrieved from the user status defining information for applying customization 252 (the result of Step 713 is "NO") or in a case where the retrieved transition source identifier condition 533 does not match any value of the transition source identifier 552 of the user status history information 253 (the result of Step 714 is "NO"), the customization applying module 223 applies the customization as needed. Specifically, in a case where a customization content independent of the transition source is defined, the customization is applied to the request message transmitted from the communication analyzing module 222, and a response message is created (Step 716). It should be noted that, similarly to the case of Step 715, the processing of applying the customization content to the response message can be realized by the conventional technology.

Lastly, the customization applying module 223 transmits the response message to the communication analyzing module 222 (Step 717).

<Specific Example of Application Executing Method>

Here, by applying the first embodiment of this invention to the above-mentioned education support system, description is given of specific operation.

The education support system is a system intended to support processing of selecting, from among education subjects, a subject that a user desires to attend, and making a registration therefor. The education support system is targeted for training or the like organized by a company.

Not all of the application executing servers included in the education support system are developed around the same, but the education support system includes applications that have been added later. Further, in a case of a company having a plurality of business bases, there is a case in which application executing servers provided with the same or similar function are disposed at the respective business bases. The education support system is configured through coordination of application executing servers having different development timings and business bases.

First, description is given of a function of each of the application executing servers included in the education support system.

Figure 4:
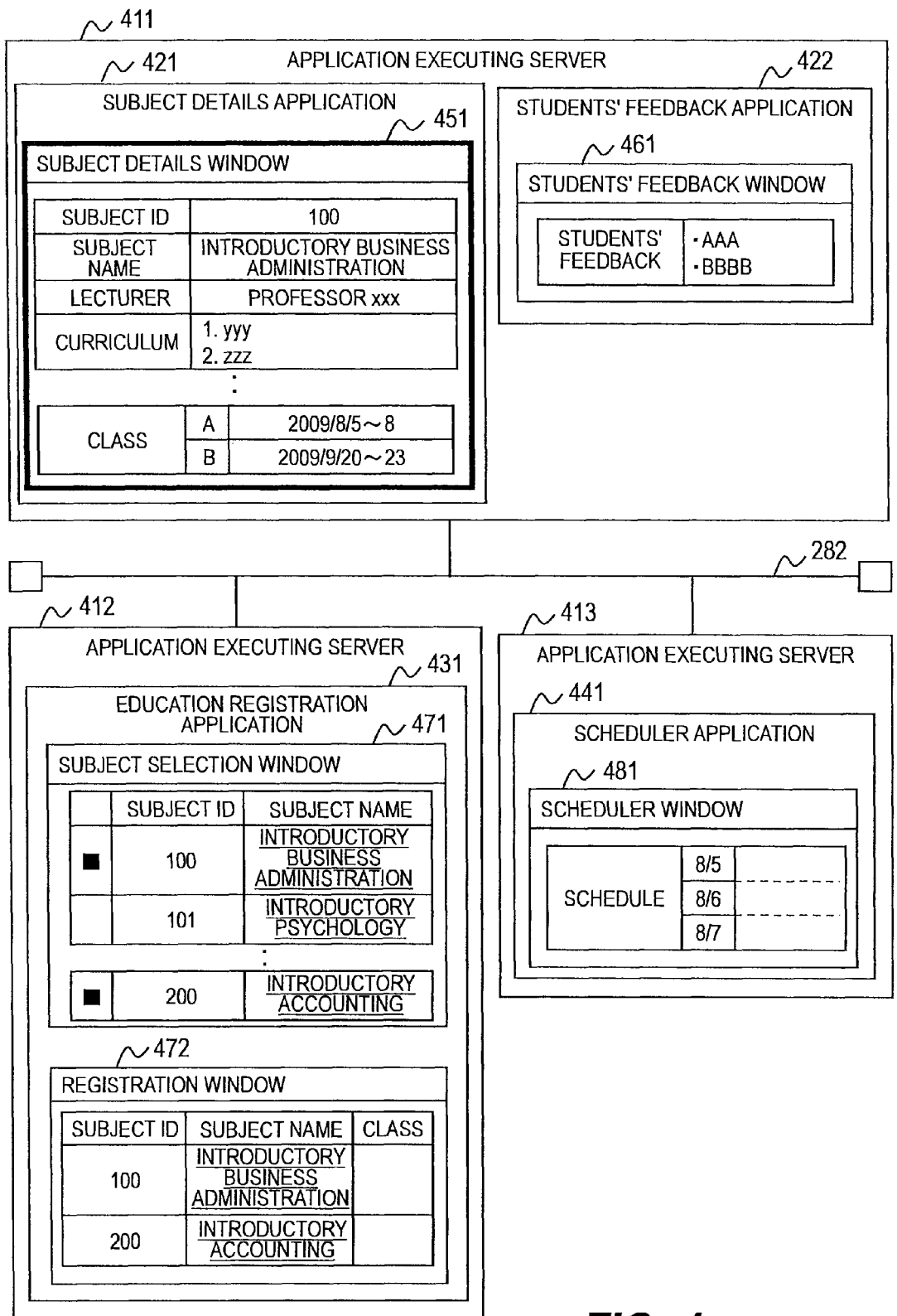
FIG. 4 is a diagram for describing a function of each of an application executing servers included in an education support system according to the first embodiment of this invention.

FIG. 4 is a diagram for describing the function of each of the application executing servers included in the education support system according to the first embodiment of this invention.

The education support system includes application executing servers 411, 412, and 413. The application executing servers 411, 412, and 413 correspond to the application executing servers 261, 262, and 263 illustrated in FIG. 2.

The application executing server 411 provides a subject details application 421 and a students' feedback application 422. The application executing server 412 provides an education registration application 431. The application executing server 413 provides a scheduler application 441. The respective applications constitute the Web system.

The subject details application 421 includes a subject details window 451 (URL: http://xxx.example/class_detail.html). The subject details window 451 displays such detailed information as a curriculum and a timetable of the education subject.

The students' feedback application 422 includes a students' feedback window 461 (URL: http://xxx.example/feedback.html). The students' feedback window 461 displays feedback or the like of a person who has attended the education subject before.

The education registration application 431 includes a subject selection window 471 (URL: http://xxx.education/selection.html) and a subject registration window 472 (URL: http://xxx.education/registration.html).

The subject selection window 471 displays a list of education subjects scheduled to be opened for the user. The subject registration window 472 displays a list of subjects that the user desires to attend so as to receive, for each subject, an input of a date at which the user desires to attend.

The scheduler application 441 includes a scheduler window 481 (URL: http://yyy.schedule/schedule.html). The scheduler window 481 displays a schedule of the user.

Figure 8:
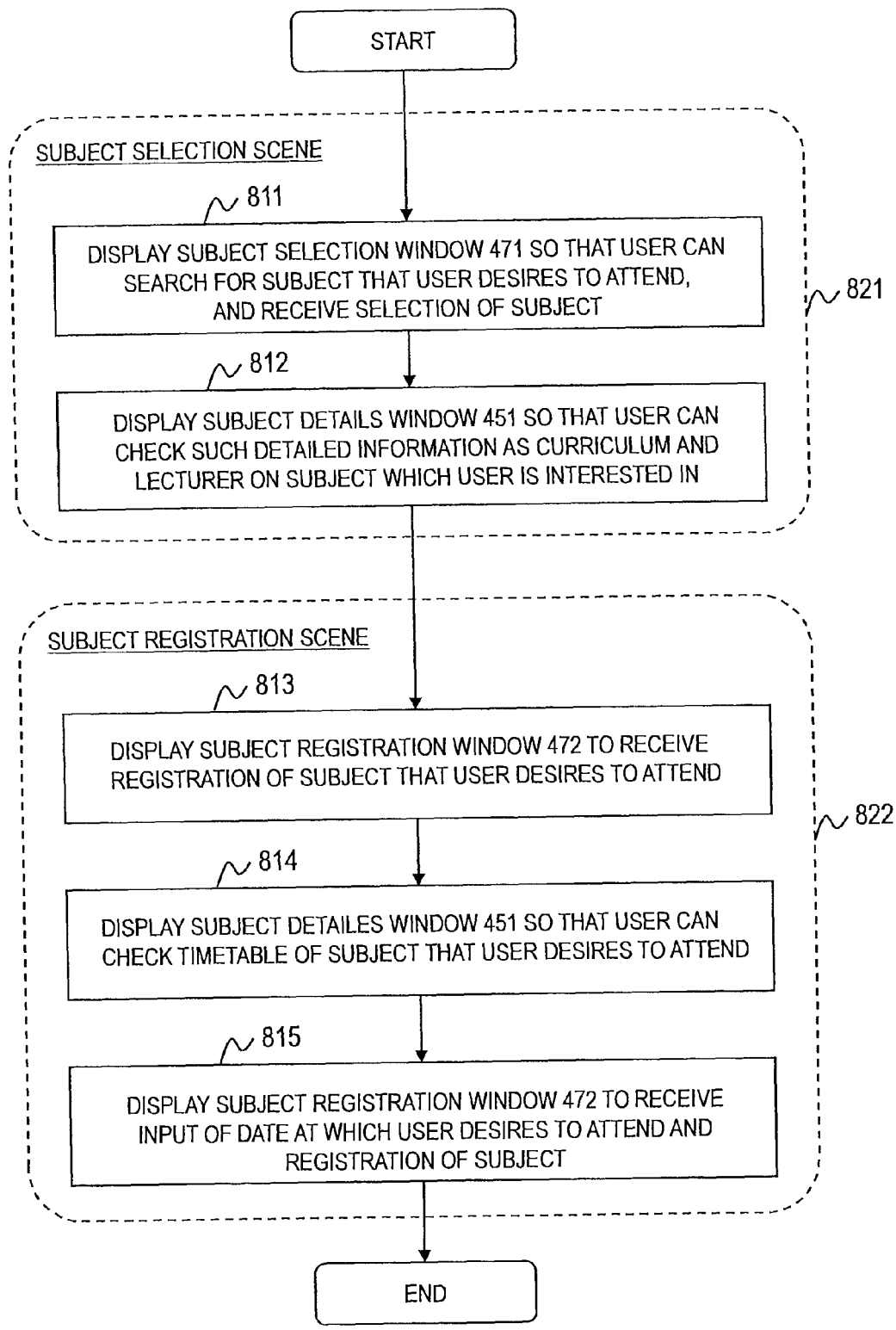
FIG. 8 is a flow chart illustrating a flow of a task that uses an education registration application of an education support system according to the first embodiment of this invention.

FIG. 8 is a flow chart illustrating a flow of a task that uses the education registration application 431 of the education support system according to the first embodiment of this invention.

The education support system first displays the subject selection window 471 so that the user can search for a subject that the user desires to attend among the education subjects that are currently opened or scheduled to be opened, and receives the selection of a subject which the user is interested in (Step 811).

The education support system displays the subject details window 451 so that the user can check, with regard to the subject of interest selected in the processing of Step 811, such detailed information as a curriculum and a lecturer (Step 812). The user refers to the subject details window 451 to check the details of the subject, and then decides whether or not to attend the selected subject.

The education support system displays the subject registration window 472 to receive a registration of the subject that the user has decided to attend in the processing of Step 812 (Step 813).

The education support system displays the subject details window 451 again so that the user can check the timetable of the subject that the user desires to attend (Step 814).

The education support system displays the subject registration window 472 so that the user can input a date at which the user desires to attend and make a registration for the subject based on the timetable checked in the processing of Step 814 (Step 815).

Further, in the flow chart illustrated in FIG. 8, in the flow in which the user uses the education support system to make a registration for an education subject, Steps 811 and 812 are set as a subject selection scene 821. On the other hand, Steps 813 to 815 are set as a subject registration scene 822.

Further, based on the customization defining information 251 illustrated in FIG. 5A and the user status defining information for applying customization 252 illustrated in FIG. 5B, description is given of operation of the customization executing server 221, which corresponds to the flow chart illustrated in FIG. 8. In addition, description is also given of a status of the user status history information 253 in each processing.

Here, for the sake of simplification, the processing starts from a state in which no value is registered in the user status history information 253.

In Step 811, the customization executing server 221 receives a request message for allowing the client 212 to access the subject selection window 471 (URL: http://xxx.education/selection.html). The processing of Step 811 corresponds to the processing of Step 612 of FIG. 6.

Further, the user status defining information for applying customization 252 does not include a row whose customization target identifier 532 matches the URL of the subject selection window 471. In other words, the result of the processing in Step 613 of FIG. 6 is "NO".

The locational information of the transition destination window matches the value of the transition source identifier condition 533 of the row 541 of the user status defining information for applying customization 252 (the result of Step 616 of FIG. 6 is "YES"), and hence the communication analyzing module 222 updates the user status history information 253. Specifically, a row in which the identifier of the reference destination (URL of subject selection window 471) is set in the transition destination identifier 553 is newly added to the user status history information 253 (Step 617 of FIG. 6). At this point, the user status history information 253 has a state illustrated in user status history information 1011 of FIG. 10A.

Next, in Step 812, the customization executing server 221 receives a request message for allowing the client 212 to access the subject details window 451 (URL: http://xxx.example/class_detail.html) (Step 612 of FIG. 6).

The communication analyzing module 222 acquires a row whose customization target identifier 532 matches the locational information of the transition destination window (URL of subject details window 451) from the user status defining information for applying customization 252. Further, the communication analyzing module 222 acquires a row whose customization ID 551 matches the customization ID 531 of the acquired row from the user status history information 253. In the processing of Step 812, the customization target identifiers 532 in the rows 541 and 542 of the user status defining information for applying customization 252 match the URL of the subject details window 451, and further, the customization ID 531 (=100) of the row 541 matches the customization ID 551 in the row of the user status history information 1011. Accordingly, the result of Step 613 of FIG. 6 becomes "YES", and the communication analyzing module 222 updates the user status history information 1011 into user status history information 1021 illustrated in FIG. 10B through the processing of Steps 614 and 615 of FIG. 6. After that, the customization applying module 223 applies a customization content 1 of the row 521 of the customization defining information 251 to the subject details window 451 (Step 620 of FIG. 6, and FIG. 7). After application of the customization, the corresponding row in the user status history information 1021 is deleted (Step 622 of FIG. 6).

Next, in Step 813, the customization executing server 221 receives a request message for allowing the client 212 to access the subject registration window 472 (URL: http://xxx.education/registration.html) (Step 612 of FIG. 6).

Similarly to Step 811, the locational information of the transition destination window matches the value of the transition source identifier condition 533 of the row 542 of the user status defining information for applying customization 252 (the result of Step 616 of FIG. 6 is "YES"), and hence the communication analyzing module 222 updates the user status history information 253 (Step 617 of FIG. 6). At this point, the user status history information 253 has a state illustrated as user status history information 1031 in FIG. 10C.

Next, in Step 814, the customization executing server 221 receives a request message for allowing the client 212 to access the subject details window 451 (URL: http://xxx.example/class_detail.html).

The communication analyzing module 222 acquires a row whose customization target identifier 532 matches the locational information of the transition destination window (URL of subject details window 451) from the user status defining information for applying customization 252. Further, the communication analyzing module 222 acquires a row whose customization ID 551 matches the customization ID 531 of the acquired row from the user status history information 1031.

The row whose value satisfies the condition is acquired in the processing of Step 814 (the result of Step 613 of FIG. 6 is "YES"), and hence the communication analyzing module 222 updates the user status history information 1031 into user status history information 1041 illustrated in FIG. 10D through the processing of Steps 614 and 615 of FIG. 6. After that, the customization applying module 223 applies a customization content 2 of the row 522 of the customization defining information 251 to the subject details window 451 (Step 620 of FIG. 6, and FIG. 7). After application of the customization, the corresponding row in the user status history information 1041 is deleted (Step 622 of FIG. 6).

Lastly, in Step 815, the customization executing server 221 receives a request message for allowing the client 212 to access the subject registration window 472 (URL: http://xxx.education/registration.html). The communication analyzing module 222 analyzes the received request message. At this point, the condition is not satisfied (the results of Steps 613 and 616 of FIG. 6 are "NO"), and hence the communication analyzing module 222 does not update the user status history information 253.

Figure 9:
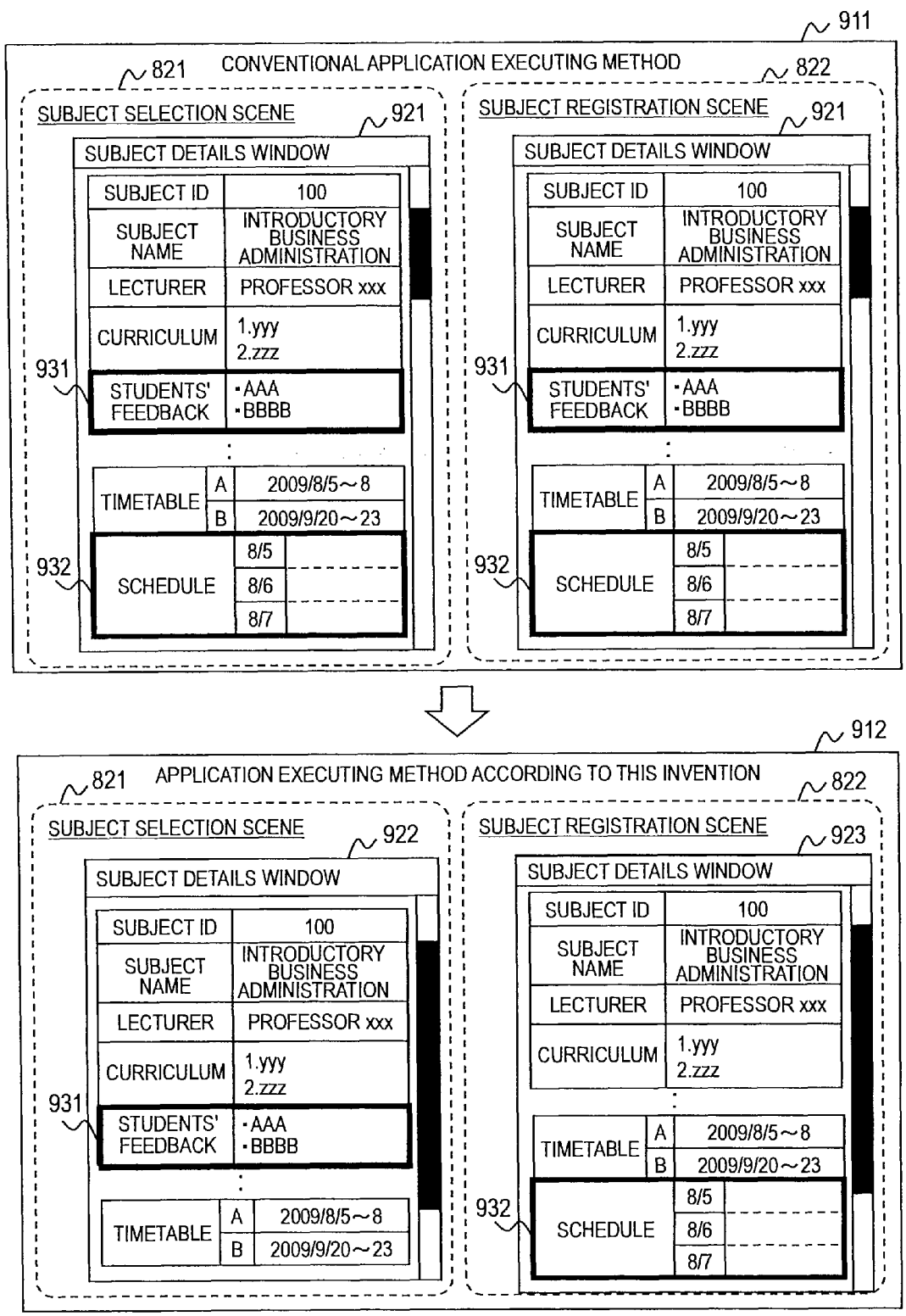
FIG. 9 is an explanatory diagram illustrating examples of subject details windows that are displayed in respective scenes of the education support system according to the first embodiment of this invention.

FIG. 9 is a diagram illustrating examples of the subject details windows that are displayed in the respective scenes of the education support system according to the first embodiment of this invention.

FIG. 9 illustrates the subject details windows 451 in a case where a conventional application executing method is applied, and the subject details windows 451 in a case where the application executing method according to the first embodiment of this invention is applied.

In a result 911 obtained through the conventional application executing method, identical subject details windows 921 are displayed for both the subject selection scene 821 and the subject registration scene 822. In each of the subject details windows 921, students' feedback 931 and a schedule 932 are displayed at the same time in association with the default subject details window 451 illustrated in FIG. 4.

On the other hand, in a result 912 obtained through the application executing method according to the first embodiment of this invention, a subject details window 922 is displayed in the case of the subject selection scene 821 whereas a subject details window 923 is displayed in the case of the subject registration scene 822.

The students' feedback 931 is associated with the subject details window 922 displayed in the subject selection scene 821. On the other hand, the schedule 932 of the user is associated with the subject details window 923 displayed in the subject registration window 822.

Referring to FIG. 9, each of the subject details windows has a scroll bar disposed on the right thereof. In comparison with the conventional application executing method, the subject details window according to the first embodiment of this invention has fewer items to be displayed, and hence a scrolling area can be made smaller. In other words, it becomes possible for the user to find a desired piece of information promptly.

<Customization Definition>

Next, with reference to FIGS. 11 to 13B, description is given of a user status defining window that is used by the user to define the user status defining information for applying customization 252. According to this invention, the customization of an application can be performed by the user himself/herself. In other words, a customization defining function is operable from the client.

The user status defining window, which can be generated as needed while the user is executing the application, is activated in response to a request from the user. The user defines, via the user status defining window, the status of the user including a condition for applying customization, and stores the defined status in the user status defining information for applying customization 252.

With regard to a timing at which the user changes the application, a case in which the user is executing the application is assumed. Here, examples of changing the application include addition of a display item. While executing the application, the user executes an application changing function so as to change, in response to change in task, the application into a form suited to the purpose of the task. The user uses the application changing function to define the application changing method. In order to implement the application changing function, it is only necessary that the conventional technology be used, and hence detailed description thereof is omitted here. The method through which the user calls the application changing function includes, for example, a method in which the user uses a tool bar in the window while executing the application and a method in which the user uses a contextual menu.

Once the status of the user, which is the condition for applying customization, has been defined and the application has been changed, it becomes possible to provide a customized application instantly.

Hereinbelow, description is given of a configuration of the customization executing server 221 to which a configuration for generating the user status defining window is added, procedures for executing a customization function, and a window for changing (customizing) an application.

Figure 11:
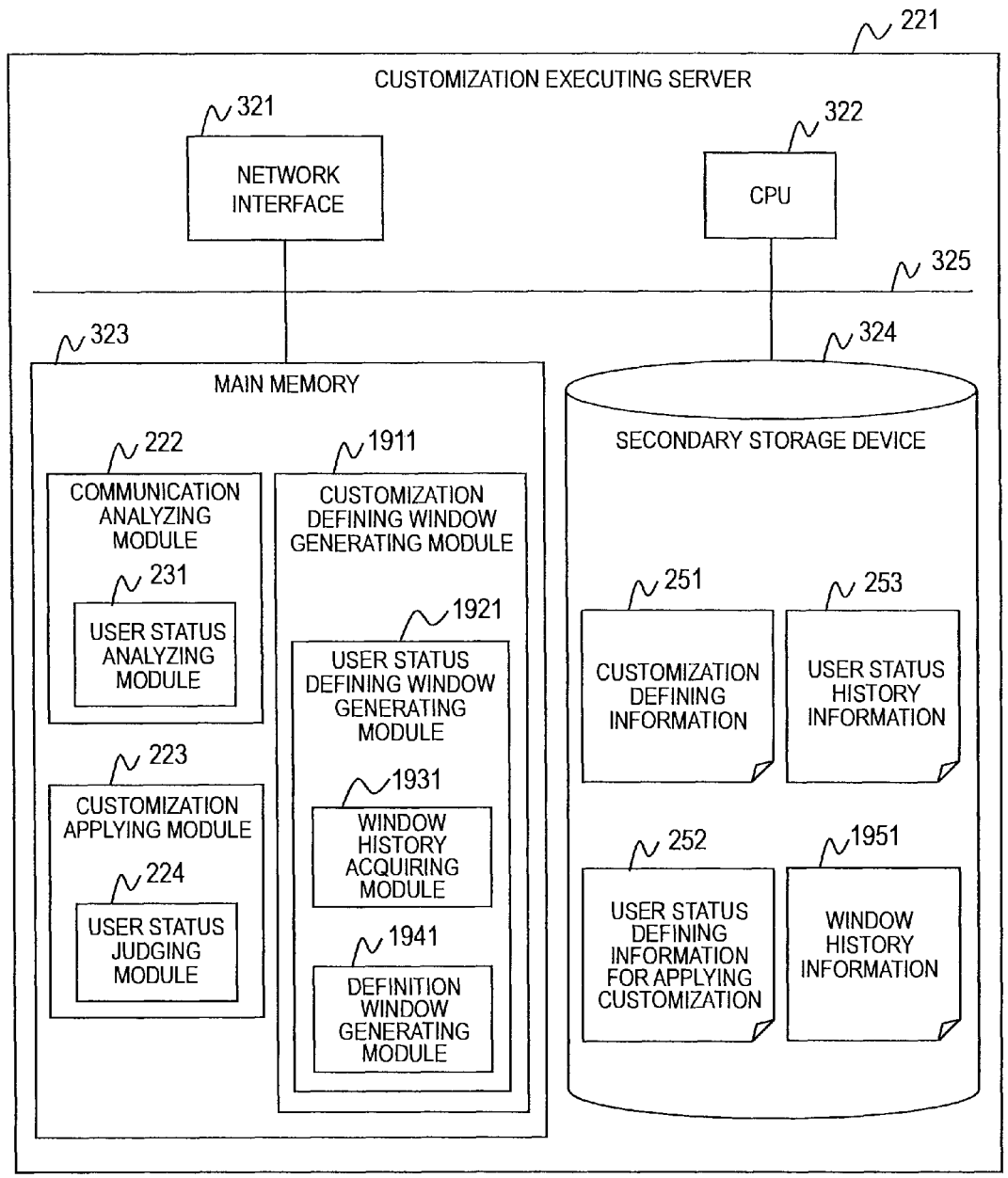
FIG. 11 is a block diagram illustrating a configuration of a customization executing server that includes a customization function for an application according to the first embodiment of this invention.

FIG. 11 is a block diagram illustrating the configuration of the customization executing server 221 that includes the customization function for an application according to the first embodiment of this invention.

In addition to the configuration illustrated in FIG. 3, the configuration of the customization executing server 221 illustrated in FIG. 11 is added with a configuration for defining the change of an application. Specifically, the main memory 323 stores a customization defining window generating module 1911, and further, the secondary storage device 324 stores window history information 1951.

The customization defining window generating module 1911 generates a definition window for receiving input from the user in a case of changing the application. Further, the customization defining window generating module 1911 includes a user status defining window generating module 1921. The user status defining window generating module 1921 generates a user status defining window for inputting information for defining a timing at which the application is changed.

Further, the user status defining window generating module 1921 includes a window history acquiring module 1931 and a definition window generating module 1941. The window history acquiring module 1931 acquires communication information between the user and the application. The definition window generating module 1941 generates the user status defining window.

In the window history information 1951, there is stored the communication information between the user and the application. The window history information 1951 includes the locational information (URL) of one or more applications for which instructions of execution have been given before the user reaches the application of the change target, the window information of those applications, and the execution order of the applications.

Next, description is given of processing for implementing the customization function. The processing of defining customization may be divided into processing 2011 in which the window history information is stored when normal task processing is performed by using an application and processing 2031 in which the customization function is executed.

Figure 12A:
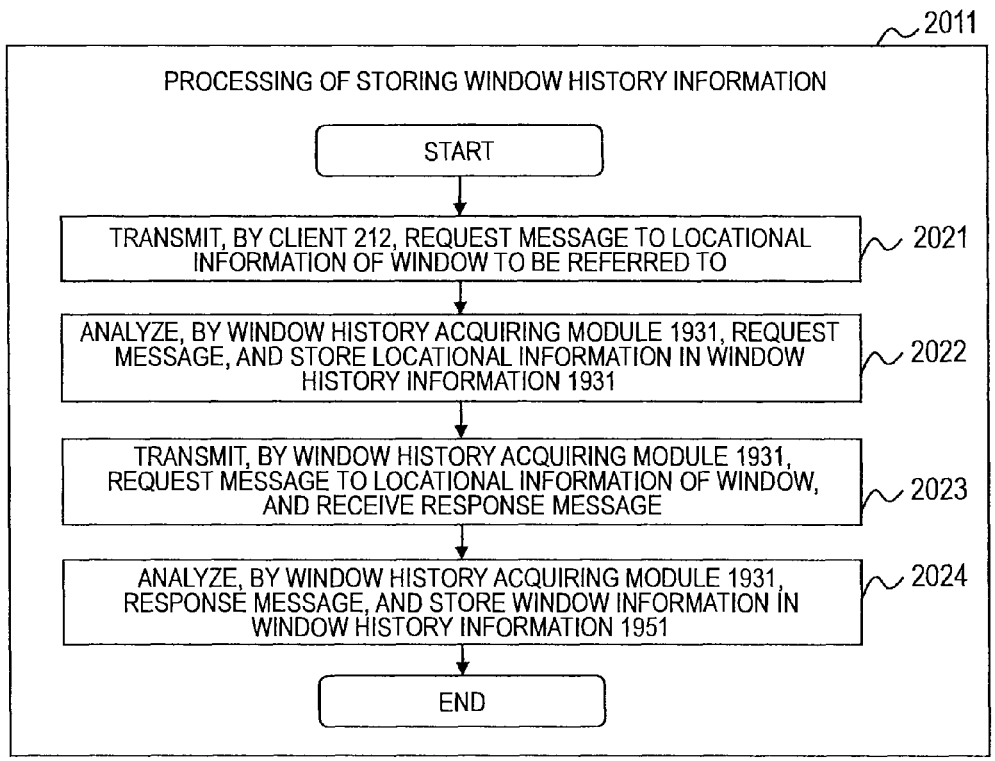
FIG. 12A is a flow chart illustrating procedures of a processing in which window history information is stored according to the first embodiment of this invention.

FIG. 12A is a flow chart illustrating procedures of the processing 2011 in which the window history information is stored according to the first embodiment of this invention.

The client 212 transmits a request message to the locational information of a window provided by an application requested by the user (Step 2021).

The user status defining window generating module 1921 uses the window history acquiring module 1931 to acquire the request message transmitted in the processing of Step 2021. Further, the user status defining window generating module 1921 analyzes the structure of the request message to acquire the locational information of the transition destination window, and then stores the locational information in the window history information 1951 (Step 2022). For example, in the case of HTTP communication, by acquiring a request URI parameter that is set in a request row included in the request message, it is possible to acquire the locational information of the transition destination.

The window history acquiring module 1931 transmits a request message to an application associated with the acquired locational information of a window, and receives a response message from the application (Step 2023).

The window history acquiring module 1931 analyzes the response message acquired in the processing of Step 2023 to acquire such information as window information, and then stores the information in the window history information 1951. For example, in the case of HTTP communication, by acquiring a value set in the HTTP header or the HTTP body of the response message, it is possible to acquire the window information and the like.

Figure 12B:
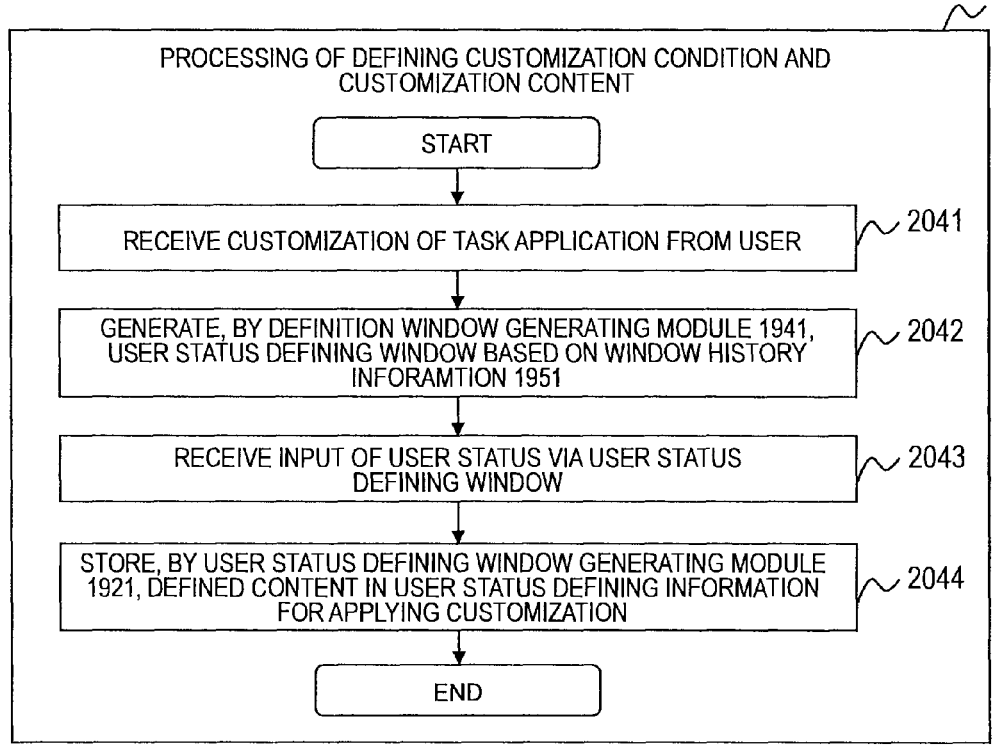
FIG. 12B is a flow chart illustrating procedures of a processing in which a customization condition and a customization content are defined according to the first embodiment of this invention.

FIG. 12B is a flow chart illustrating procedures of the processing 2031 in which the customization condition and the customization content are defined according to the first embodiment of this invention.

The user status defining window generating module 1921 receives an execution request for the customization of an application, which has been requested by the user via the client 212. As described above, the customization of an application is requested while the user is executing the application because the application is changed into a form suited to the purpose of the task in response to the change in task. The user status defining window generating module 1921 executes a customization changing function of the application in response to the request from the user. Then, the user status defining window generating module 1921 presents a customization defining window to the user, and then receives input of a specific customization content (Step 2041). It should be noted that the details of the customization defining window are described later with reference to FIG. 13A.

Based on the window history information 1951 in which the communication information between the user and the application is stored, the definition window generating module 1941 of the user status defining window generating module 1921 generates a user status defining window (Step 2042). It should be noted that the details of the user status defining window are described later with reference to FIG. 13B. The user status defining window includes transition history information indicating the order in which the user has given instructions to execute applications, and window information of the applications corresponding to the transition history information. In addition, the user status defining window contains a function for defining the status of the user as the condition for applying customization, for example, a dialog box.

After the application changing method has been defined, the user status defining window generating module 1921 receives input of the user's status defined as the condition for applying customization via the user status defining window generated in the processing of Step 2042 (Step 2043).

The user status defining window generating module 1921 stores the content defined in the processing of Step 2043 in the user status defining information for applying customization 252 (Step 2044).

Further, description is given of a window through which the user actually customizes an application by following the above-mentioned procedures.

Figure 13A:
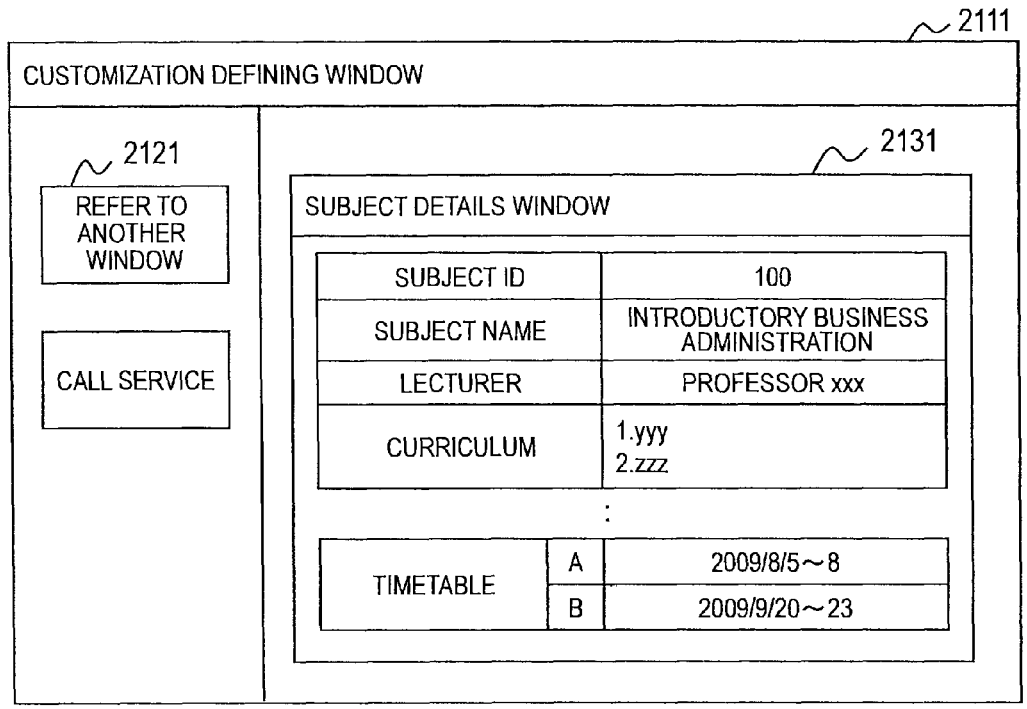
FIG. 13A is an explanatory diagram illustrating an example of a customization defining window according to the first embodiment of this invention.

FIG. 13A is a diagram illustrating an example of a customization defining window 2111 according to the first embodiment of this invention.

In the customization defining window 2111, there are displayed elements 2121 necessary for defining the application changing method and window information 2131 of an application of the change target. Specifically, by disposing necessary elements 2121 in association with the window of the change target, the application is customized.

Figure 13B:
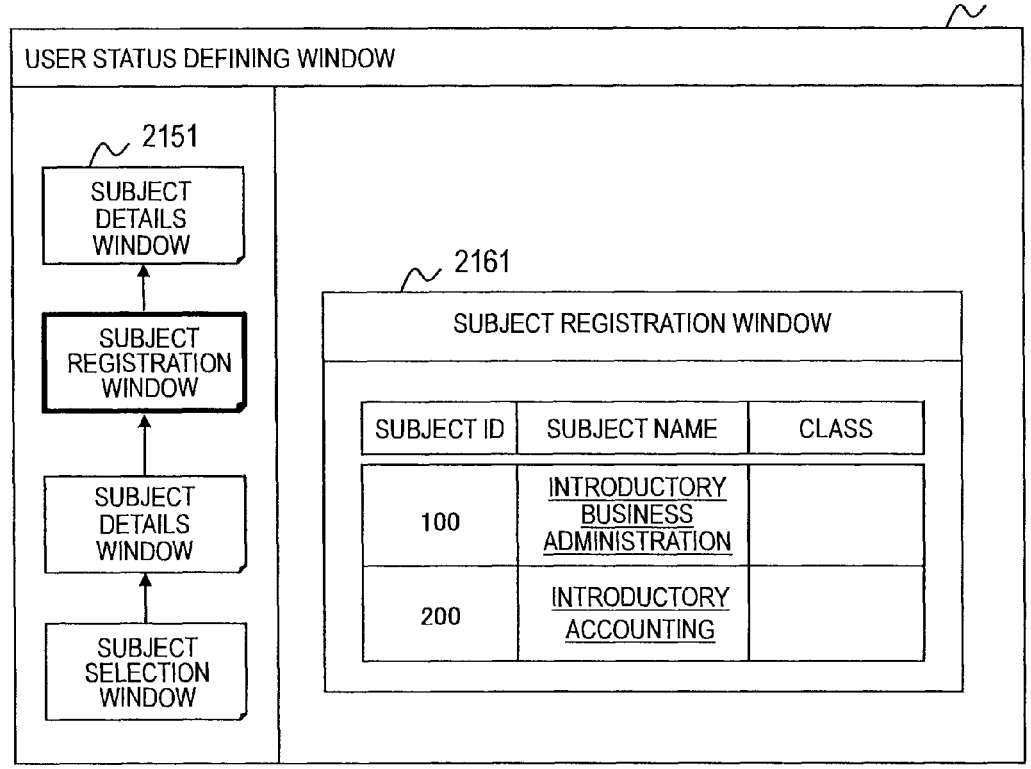
FIG. 13B is an explanatory diagram illustrating an example of a user status defining window according to the first embodiment of this invention.

FIG. 13B is a diagram illustrating an example of a user status defining window 2141 according to the first embodiment of this invention.

In the user status defining window 2141, a transition history 2151 and a window structure 2161 are displayed. The transition history 2151 is transition history information of the windows of applications for which instructions of execution have been given before the user gives an instruction to execute the application of the change target. The window structure 2161 is structure information of windows corresponding to the respective windows included in the transition history 2151. When a window is selected from the transition history 2151, the corresponding window is displayed in the window structure 2161.

While executing the application, the user executes the application changing function according to the change in task, and, by using the customization defining window 2111, customizes the application. Then, after the customization is finished, the user uses the user status defining window 2141 to define the user's status that is to serve as the condition for applying the customization. Hereinbelow, a specific example of using the user status defining window 2141 is described.

In the education support system, the user can make a selection in the transition history 2151 as to whether the user has referred to a subject list window or a subject registration window before referring to the subject details window. Thus, the user can define the locational information of the transition source window of a window selected in the transition history 2151 as the condition for applying customization.

In this manner, via the user status defining window, based on the history or the like of applications executed before the application of the change target is reached, it is possible to define the status of the user as the condition for applying customization.

<Effects>

According to the first embodiment of this invention, even in a case of displaying the same window, it is possible to change information to be displayed according to the flow of the task. Specifically, by setting, as a condition for applying customization definition, the locational information of one or more applications that have been accessed before the user accesses the window of the application of the change target, it is possible to perform the customization according to the flow of the task.

For example, in the education support system, in a case where the details of a subject are referred to in the subject selection scene, it is possible to display information that is useful in selecting a subject, such as students' feedback. On the other hand, in a case where a registration for a subject is made after deciding which subject is to be selected, it is possible to display the schedule of the user along with the timetable of the subject. As described above, it becomes possible for the user to appropriately acquire information suited to the purpose of the task that is carried out by the user.

Further, according to the first embodiment of this invention, the user can customize an application by himself/herself, and hence it is possible to perform such customization that is more suited to the task compared with a case in which the application is customized by a system developer or the like.

As described above, according to the first embodiment of this invention, the user can customize an application by himself/herself so that the user can be provided with an appropriate function for each task, and hence productivity of the task is expected to increase.

Second Embodiment

Next, referring to FIGS. 14A to 18D, description is given of a second embodiment of this invention.

In the first embodiment, the condition for changing an application is the locational information of windows of one or more applications accessed before the user accesses the window of the application of the change target.

However, in a case of such an application that has a window using a dynamic hypertext markup language (DHTML), such as JavaScript, in which the structure information of a window is dynamically changed without changing the locational information thereof, it is possible to dynamically change the structure information of the window of an application without the user directly communicating with the application. Accordingly, in a case where the user uses an application in which, in situations of different tasks, the locational information of the windows is the same and the structure information of the windows can be dynamically changed, there is a fear that the method described in the first embodiment of this invention cannot change the application according to the situation of the task.

In view of the above, the second embodiment of this invention is aimed at providing an application customized according to the task, even in a case where one or more applications executed before the execution of the application of the change target provide window information whose structure information can be dynamically changed.

It should be noted that, in the second embodiment, the description of configurations common to the first embodiment is appropriately omitted, and description is focused on configurations different from the first embodiment. Further, the second embodiment has the same system configuration as that of the first embodiment illustrated in FIGS. 2 and 3.

<Content of Each Piece of Definition Information>

Here, description is given of details of definition information used in an application executing system according to the second embodiment of this invention. Similarly to the first embodiment of this invention, the definition information has three types of: customization defining information 251; user status defining information for applying customization 252; and user status history information 253, which are stored in the customization executing server 221.

FIG. 14A is a diagram illustrating an example of the customization defining information 251 according to the second embodiment of this invention. The customization defining information 251 is the same as that of the first embodiment, and hence description thereof is omitted.

FIG. 14B is a diagram illustrating an example of the user status defining information for applying customization 252 according to the second embodiment of this invention.

In addition to the configuration of the first embodiment illustrated in FIG. 5B, the user status defining information for applying customization 252 is added with a transition source structure condition 1111 as a new condition for applying customization. A customization ID 531, a customization target identifier 532, and a transition source identifier condition 533 are the same as those of the first embodiment.

The transition source structure condition 1111 is the structure information of a window, which is selected by the user in a window from window information provided by one or more applications for which instructions for execution have been given before the user gives an instruction to execute the application of the change target.

For example, a row 1131 of the user status defining information for applying customization 252 illustrated in FIG. 14B shows that, before a window associated with locational information "http://xxx.example/company_detail.html", which is provided by the application of the change target, is displayed, a window associated with locational information "http://example/company_list.html" is displayed. Further, the row 1131 shows that a customization content is applied in a case where the user selects structure information of the window, which is associated with the locational information "/html/group/label=Area", in the window associated with "http://example/company_list.html". The structure information may be expressed by using a language construction that specifies a particular part of a document compliant with such a markup language as an XML path language (XPATH).

Here, in the transition source structure condition 1111, as the structure information of windows, which the user has selected on windows from the window information provided by one or more applications for which instructions for execution have been given before the user gives an instruction to execute the application of the change target, values that are linked in the order in which the instructions to execute the applications have been given may be included.

FIG. 14C is a diagram illustrating an example of the user status history information 253 according to the second embodiment of this invention.

In addition to the configuration of the first embodiment illustrated in FIG. 5C, the user status history information 253 is added, as a new condition for applying customization, with a selected structure 1121 that is window structure information selected by the user. A customization ID 551, a transition source identifier 552, and a transition destination identifier 553 are the same as those of the first embodiment.

The selected structure 1121 is structure information that has been selected on windows provided by a plurality of applications accessed before the user accesses the application of the change target.

For example, a row 1141 of the user status history information 253 illustrated in FIG. 14C shows that the window associated with the locational information "http://xxx.example/company_detail.html" is displayed at present. The row 1141 also shows that, before the window associated with "http://xxx.example/company_detail.html" is displayed, the window associated with the locational information "http://example/company_list.html", which is provided by the application, is displayed, and the user selects structure information associated with "/html/group/label=Area" in that window.

<Flow of Processing Performed by Communication Analyzing Module>

Figure 15A:
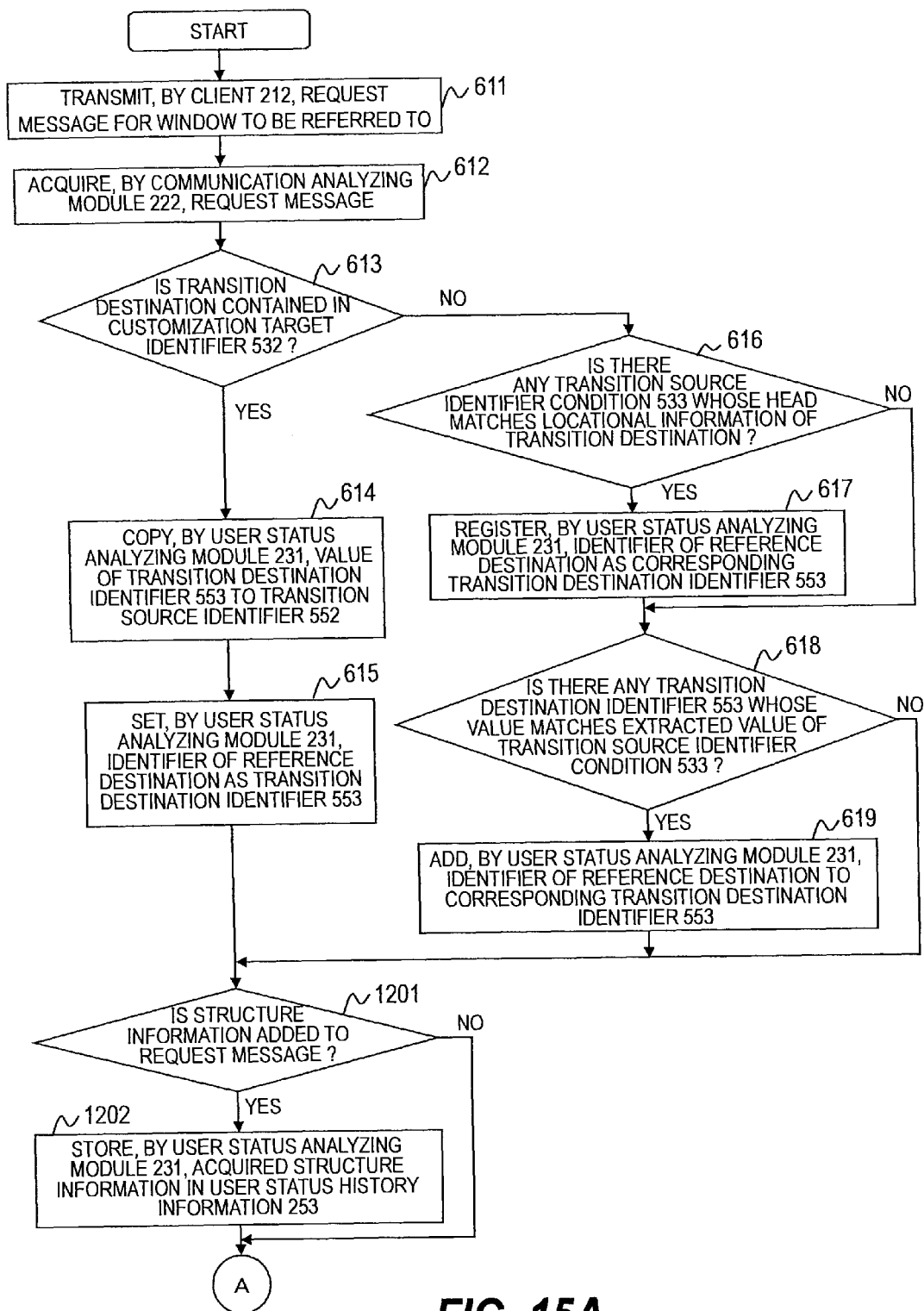
FIGS. 15A and 15B are flow charts illustrating processing procedures performed by the communication analyzing module according to the second embodiment of this invention.
Figure 15B:
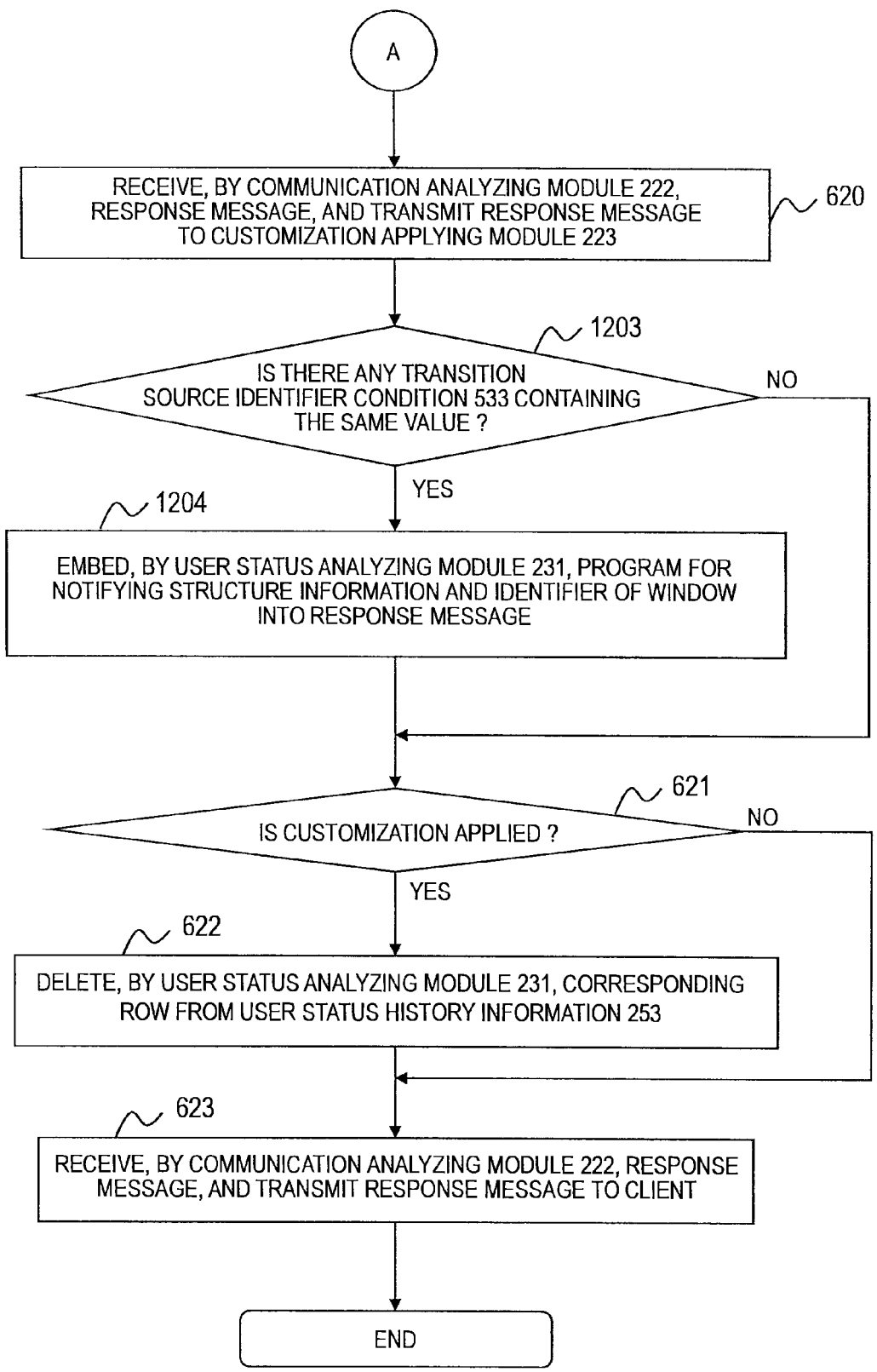

FIGS. 15A and 15B are flow charts illustrating processing procedures performed by the communication analyzing module 222 according to the second embodiment of this invention.

In the flow charts illustrated in FIGS. 15A and 15B, in addition to the processing illustrated in FIG. 6, processing from Steps 1201 to 1204 is newly added. It should be noted that processing from Steps 611 to 623 of FIGS. 15A and 15B is the same as the processing from Steps 611 to 623 of FIG. 6, and hence description thereof is omitted. Description is given of the processing from Steps 1201 to 1204.

The user status analyzing module 231 analyzes the structure of the request message acquired in the processing of Step 612, and then judges whether or not the structure information selected in a window by the user and an identifier indicating the locational information of a window corresponding to the response message are added (Step 1201). Then, in a case where the structure information is added to the request message (the result of Step 1201 is "YES"), the user status analyzing module 231 executes processing of Step 1202. On the other hand, in a case where the structure information is not included (the result of Step 1201 is "NO"), the user status analyzing module 231 executes the processing of Step 620.

The user status analyzing module 231 identifies, from the user status defining information for applying customization 252, a row in which a pair of the transition source structure condition 1111 and the transition source identifier condition 533 have the same values as those of a pair of the structure information and the locational information of the window, which have been acquired in the processing of Step 1201. Then, the user status analyzing module 231 acquires the customization ID 531 corresponding to the identified row to identify, in the user status history information 253, a row whose customization ID 551 has the same value as that of the customization ID 531, and then sets, in the selected structure 1121 of that row, the structure information acquired in the processing of Step 1201 (Step 1202).

The user status analyzing module 231 judges whether or not the user status defining information for applying customization 252 includes a row whose transition source identifier condition 533 has the same value as that of the locational information of the transition destination acquired in the processing of Step 612 and whose transition source structure condition 1111 has a value that defines the structure information of a window (Step 1203). In a case where there is a row whose transition source identifier condition 533 and transition source structure condition 1111 satisfy those conditions (the result of Step 1203 is "YES"), the user status analyzing module 231 executes processing of Step 1204. On the other hand, in a case where there is no row whose transition source identifier condition 533 and transition source structure condition 1111 satisfy those conditions (the result of Step 1203 is "NO"), the user status analyzing module 231 executes the processing of Step 621.

The user status analyzing module 231 acquires the structure information selected by the user from the window information corresponding to the response message received from the customization applying module 223, and then adds, to the response message, a program for acquiring the locational information of the window and the selected structure information (Step 1204). Specifically, the program is for executing such processing in which, in a case where the user transmits a next request message via a window presented to the client by means of the received response message, the structure information selected in the window by the user and an identifier indicating the locational information of the corresponding window are transmitted to the customization executing server 221.

The program that transmits, to the customization executing server 221, the selected structure information and the locational information of the window corresponding to the response message can be implemented by using such a programming language as JavaScript. Specifically, in the case of the Web system, a program described with JavaScript or the like may be embedded into an HTML file serving as the window information. Further, with regard to a method for transmitting the structure information to the customization executing server 221, the structure information selected in the window by the user may be stored in the HTTP header in the case of communication using HTTP, for example.

<Flow of Processing Performed by Customization Applying Module>

Figure 16:
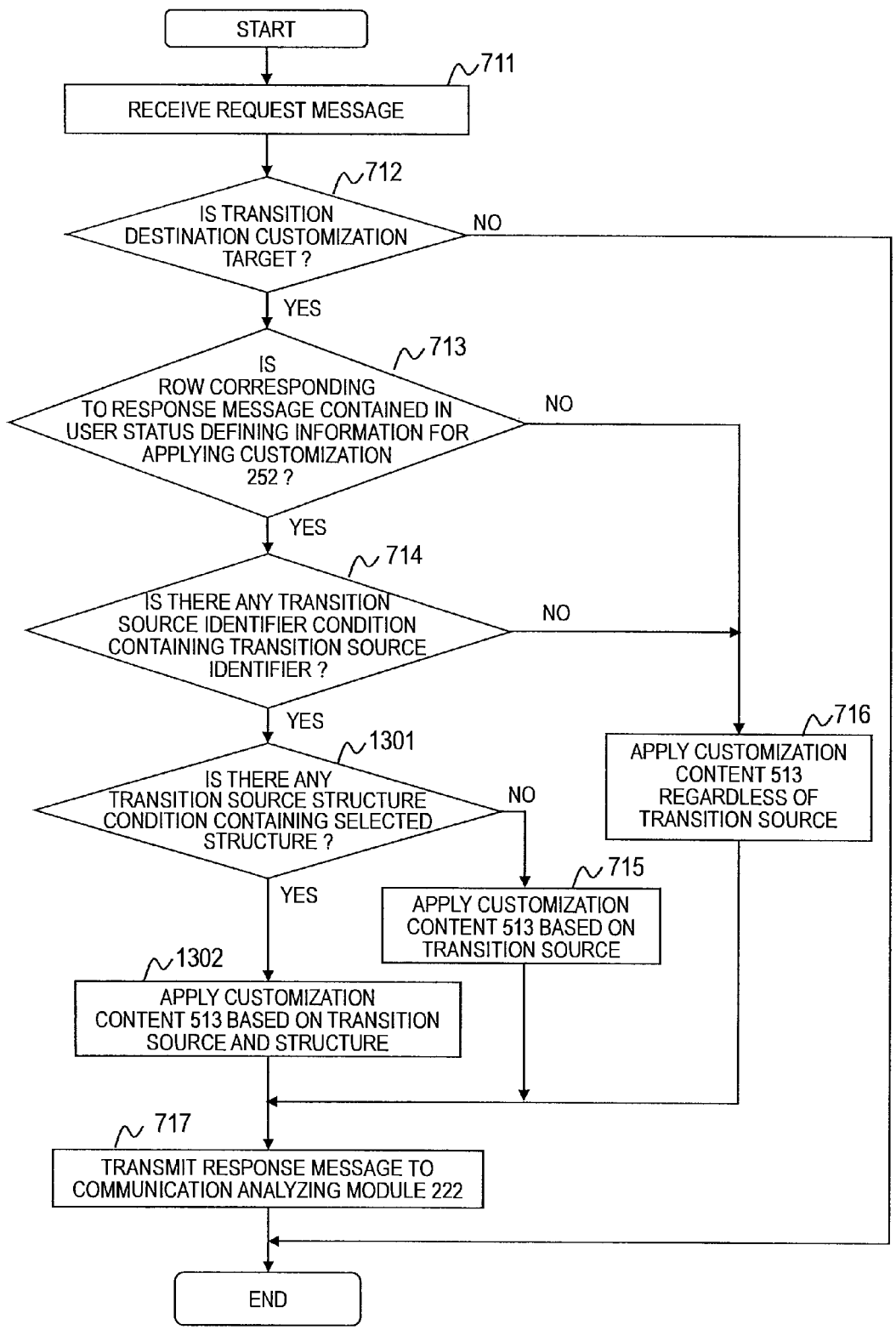
FIG. 16 is a flow chart illustrating a processing procedures performed by a customization applying module according to the second embodiment of this invention.

FIG. 16 is a flow chart illustrating the processing procedures performed by the customization applying module 223 according to the second embodiment of this invention.

In the flow chart illustrated in FIG. 16, in addition to the processing illustrated in FIG. 7, processing of Steps 1301 and 1302 is newly added. It should be noted that processing from Steps 711 to 717 of FIG. 16 is the same as the processing from Steps 711 to 717 of FIG. 7, and hence description thereof is omitted. Description is given of the processing of Steps 1301 and 1302.

The user status judging module 241 judges whether or not the user status defining information for applying customization 252 includes a row whose transition source identifier condition 533 matches the transition source identifier 552 of the user status history information 253 acquired in the processing of Step 714 and whose transition source structure condition 1111 matches the selected structure 1121 of the user status history information 253 (Step 1301). In a case where there is a row whose transition source structure condition 1111 matches the selected structure 1121 (the result of Step 1301 is "YES"), the user status judging module 241 executes processing of Step 1302. In a case where there is no row whose transition source structure condition 1111 matches the selected structure 1121 (the result of Step 1301 is "NO"), the user status judging module 241 executes the processing of Step 715.

The customization applying module 223 applies, to the response message, the customization content 513 include in the row of the customization defining information 251, whose customization ID 511 corresponds to the value acquired in the processing of Step 1301, thereby creating a new response message (Step 1302).

<Specific Example of Application Executing Method>

Here, by applying the second embodiment of this invention to a company information reference system, description is given of specific operation and effects of the application executing method. The company information reference system is a system used in a case where the user checks information of the customer companies in a sales expansion activity.

Figure 17:
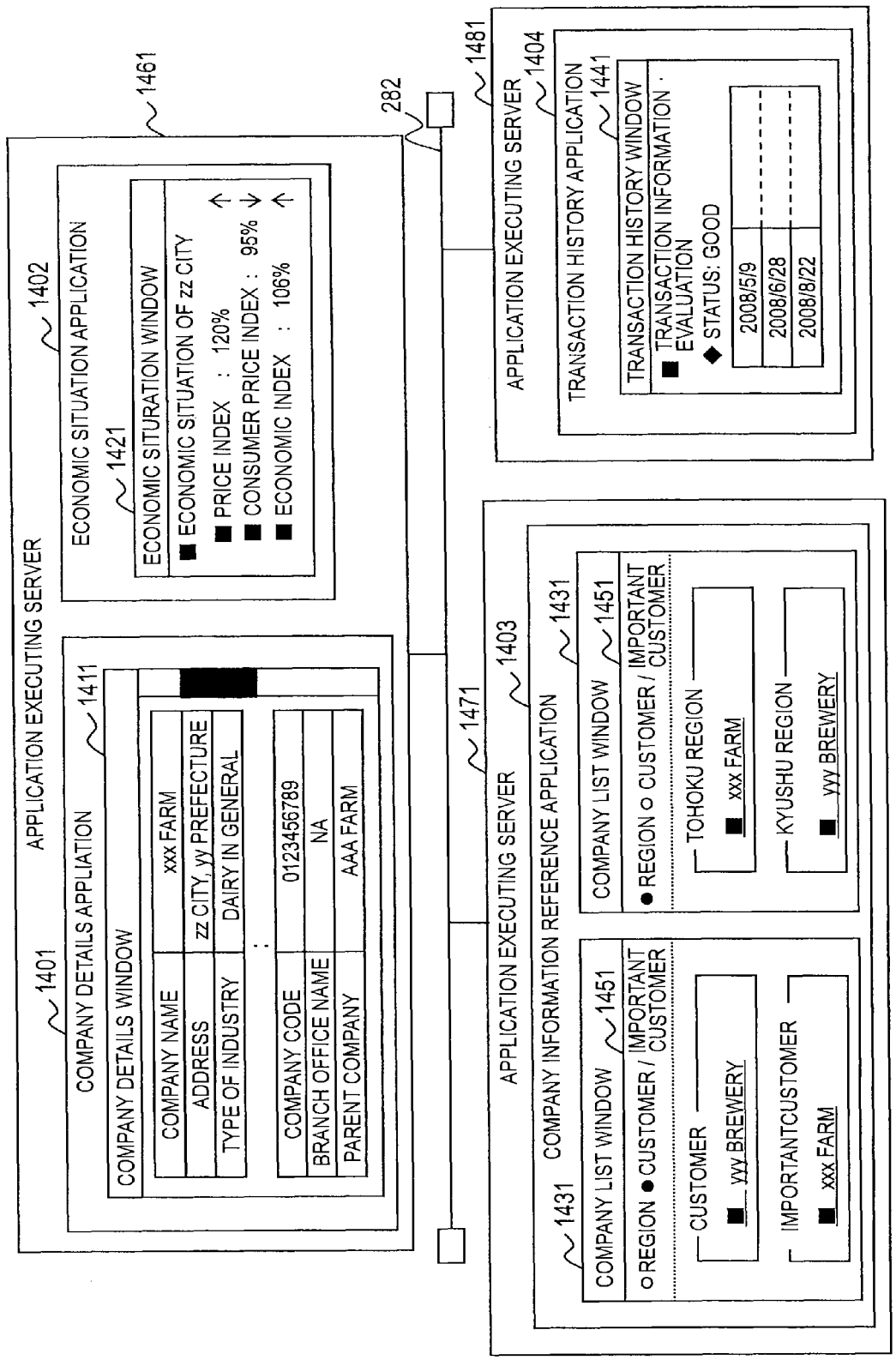
FIG. 17 is a diagram for describing a function of each of application executing servers included in a company information reference system according to the second embodiment of this invention.

FIG. 17 is a diagram for describing the function of each of the application executing servers included in the company information reference system according to the second embodiment of this invention.

The company information reference system includes application executing servers 1461, 1471, and 1481. The application executing servers 1461, 1471, and 1481 correspond to the application executing servers 261, 262, and 263 illustrated in FIG. 2.

The application executing server 1461 provides a company details application 1401 and an economic situation application 1402. The application executing server 1471 provides a company information reference application 1403. The application executing server 1481 provides a transaction history application 1404. The respective applications constitute the Web system.

The company details application 1401 includes a company details window 1411 (URL: http://xxx.example/company_detail.html) for displaying the details of company information. Further, the economic situation application 1402 includes an economic situation window 1421 (URL: http://xxx.example/area_report.html) for displaying the economic situation of the region in which a company is located.

The company information reference application 1403 includes a company list window 1431 (URL: http://example/company_list.html) for displaying a list of companies. In the company list window 1431, depending on which one of a "region" and a "customer/important customer" is selected, a window having a different structure is dynamically generated.

The transaction history application 1404 includes a transaction history window 1441 (URL: http://yyy.business/deal.html) for displaying the transaction history of a corresponding company.

Here, the following flow of a task is assumed. In order to carry out the sales expansion activity, the user uses the company information reference system to refer to the company list window 1431. After that, in order to check the details of a company, the user refers to the company details window 1411.

In this case, there are two situations: a situation in which the user checks the company details window 1411 after selecting, in the company list window 1431, a perspective of the "region" in which a company is located; and a situation in which the user checks the company details window 1411 after selecting, in the company list window 1431, a perspective of the "customer/important customer". The user has different purposes in referring to the company details window 1411 between those two situations, and hence information that the user wants to check in association with the detailed information of a company is expected to be different between the two situation.

For example, in a case where the user selects the perspective of the "region" and refers to the company details window 1411, along with the detailed information of the company, the user checks information of the economic situation window 1421 displaying the economic situation of the region as well. On the other hand, in a case where the user selects the perspective of the "customer/important customer" and refers to the company details window 1411, along with the detailed information of the company, the user sometimes checks the transaction history with the customer as well.

Hereinbelow, based on the customization defining information 251, the user status defining information for applying customization 252, and the user status history information 253 illustrated in FIGS. 14A to 14C, description is given of flows of processing performed in the situation in which the user checks the company details window 1411 from the perspective of the "region" and in the situation in which the user checks the company details window 1411 from the perspective of the "customer/important customer".

(Details Window from Perspective of "Region")

When the customization executing server 221 has received, from the client 212, a request message for accessing the company list window 1431 (URL: http://example/company_list.html), the customization executing server 221 analyzes the received request message by the communication analyzing module 222.

The locational information of the transition destination window matches the values in the row 1131 and a row 1132 of the user status defining information for applying customization 252, and hence the communication analyzing module 222 updates the user status history information 253.

Further, because the locational information of the transition destination window matches the value of the transition source identifier condition 533 and the transition source structure condition 1111 is defined, the user status analyzing module 231 embeds, into the response message to be transmitted to the client 212, the program for transmitting the structure information and the locational information of the window corresponding to the response message to the customization executing server 221 (Step 1204 of FIG. 15B). The user status history information 253 at this point has a state illustrated as user status history information 1511 of FIG. 18A.

Next, in the company list window 1431 acquired from the customization executing server 221, the user selects the "region" of perspective selection radio buttons 1451, and then selects a company whose detailed information the user wants to refer to.

The customization executing server 221 receives, from the client 212, a request message for accessing the company details window 1411 (URL: http://xxx.example/company_detail.html), and then analyzes the received request message by the communication analyzing module 222. Then, because the locational information of the transition destination window is the same as the locational information of the company details window 1411 of the change target, the communication analyzing module 222 updates the user status history information 1511.

The request message includes the structure information selected by the user in the company list window 1431, and hence the communication analyzing module 222 updates the user status history information 1511 based on the selected structure information (Step 1202 of FIG. 15A). At this point, the user status history information has a state illustrated as user status history information 1512 of FIG. 18B.

Then, because the row 1131 of the user status defining information for applying customization 252 matches the user status history information 1512, the customization applying module 223 applies a customization content 3 of a row 1151 of the customization defining information 251 to the company details window 1411.

(Details Window from Perspective of "Customer/Important Customer")

When the customization executing server 221 has received, from the client, a request message for accessing the company list window 1431, the customization executing server 221 analyzes the received request message by the communication analyzing module 222.

The locational information of the transition destination window matches the values in the row 1131 and the row 1132 of the user status defining information for applying customization 252, and hence the communication analyzing module 222 updates the user status history information 253.

Further, because the locational information of the transition destination window matches the value of the transition source identifier condition 533 and the transition source structure condition 1111 is defined, the user status analyzing module 231 embeds, into the response message to be transmitted to the client 212, the program for transmitting the structure information and the locational information of the window corresponding to the response message to the customization executing server 221 (Step 1204 of FIG. 15B). The user status history information 253 at this point has a state illustrated as user status history information 1513 of FIG. 18C.

Next, in the company list window 1431 acquired from the customization executing server 221, the user selects the "customer/important customer" of perspective selection radio buttons 1451, and then selects a company whose detailed information the user wants to refer to.

The customization executing server 221 receives, from the client 212, a request message for accessing the company details window 1411, and then analyzes the received request message by the communication analyzing module 222. Then, because the locational information of the transition destination window is the same as the locational information of the company details window 1411 of the change target, the communication analyzing module 222 updates the user status history information 1513.

The request message includes the structure information selected by the user in the company list window 1431, and hence the communication analyzing module 222 updates the user status history information 253 based on the selected structure information (Step 1202 of FIG. 15A). At this point, the user status history information has a state illustrated as user status history information 1514 of FIG. 18D.

Then, because the row 1132 of the user status defining information for applying customization 252 matches the user status history information 1514, the customization applying module 223 applies a customization content 4 of a row 1152 of the customization defining information 251 to the company details window 1411.

<Customization Definition>

Supplementary description is given of the method of setting the condition for applying customization according to the second embodiment of this invention.

In the example of the company information reference system, the user selects the company list window from the transition history 2151 of FIG. 13B, and then selects, from the window information displayed in the window structure 2161, the window structure "region" or "customer/important customer" to be registered as the condition for applying customization. After that, with the use of the customization defining window 2111, the customization content is defined. Then, along with the locational information of the selected window, the structure of the window is defined as the condition for applying customization.

<Effect>

According to the second embodiment of this invention, by adding the selected structure to the condition for applying customization, it is possible to provide the user with an application customized according to the task even in a case where one or more applications executed before the application of the change target is executed provide the window information whose structure information can be dynamically changed.

Third Embodiment

Next, referring to FIGS. 19A to 21, description is given of a third embodiment of this invention.

In the second embodiment, the conditions for changing an application are the locational information of windows of one or more applications accessed before the user accesses the window of the application of the change target, and the structure information of a window, which has been selected in the window by the user.

However, in a case where the user performs an operation via the window information provided by an application, instead of using, like the second embodiment, the structure information of a window, which is selected in a window by the user, a query identifier generated by the application may be used. The query identifier is included in a request message generated by an application in a case where the user operates a window provided by the application. For example, in the case where the application performs communication by means of HTTP, a query identifier is included in the HTTP header or the HTTP message body.

In the third embodiment, description is given of a method of providing, in a case where the user gives an instruction to execute an application, an application customized based on a query identifier generated at the time of a window operation performed by the user.

It should be noted that, in the third embodiment, the description of configurations common to the first embodiment is appropriately omitted, and description is focused on configurations different from the first embodiment. Further, the third embodiment has the same system configuration as that of the first embodiment illustrated in FIGS. 2 and 3.

<Content of Each Piece of Definition Information>

Here, description is given of details of definition information used in an application executing system according to the third embodiment of this invention. Similarly to the first embodiment of this invention, the definition information has three types of: customization defining information 251; user status defining information for applying customization 252; and user status history information 253, which are stored in the customization executing server 221.

FIG. 19A is a diagram illustrating an example of the customization defining information 251 according to the third embodiment of this invention. The customization defining information 251 is the same as that of the first embodiment, and hence description thereof is omitted.

FIG. 19B is a diagram illustrating an example of the user status defining information for applying customization 252 according to the third embodiment of this invention.

In addition to the configuration of the first embodiment illustrated in FIG. 5B, the user status defining information for applying customization 252 is added with a query identifier 1611 as a new condition for applying customization. A customization ID 531, a customization target identifier 532, and a transition source identifier condition 533 are the same as those of the first embodiment.

For example, a row 1631 of the user status defining information for applying customization 252 illustrated in FIG. 19B shows that, before the window associated with the locational information "http://xxx.example/company_detail.html", which is provided by the application of the change target, is displayed, the window associated with the locational information "http://example/company_list.html" is displayed. Further, the row 1631 shows that, in the window associated with the locational information "http://example/company_list.html", a customization content is applied in a case where the application has generated query information of "target=Area" as a result of the user performing some operation in the window.

FIG. 19C is a diagram illustrating an example of the user status history information 253 according to the third embodiment of this invention.

In addition to the configuration of the first embodiment illustrated in FIG. 5C, the user status history information 253 is added, as a new condition for applying customization, with a query identifier 1621 that is generated by an application as a result of operation performed by the user. A customization ID 551, a transition source identifier 552, and a transition destination identifier 553 are the same as those of the first embodiment.

For example, a row 1641 of the user status history information 253 illustrated in FIG. 19C shows that the window associated with the locational information "http://xxx.example/company_detail.html" is displayed at present. The row 1641 also shows that, before the window associated with "http://xxx.example/company_detail.html" is displayed, the window associated with the locational information "http://example/company_list.html", which is provided by the application, is displayed, and a query identifier identified with "target=Area" is generated as a result of the user carrying out some operation in that window.

<Flow of Processing Performed by Communication Analyzing Module>

Figure 20A:
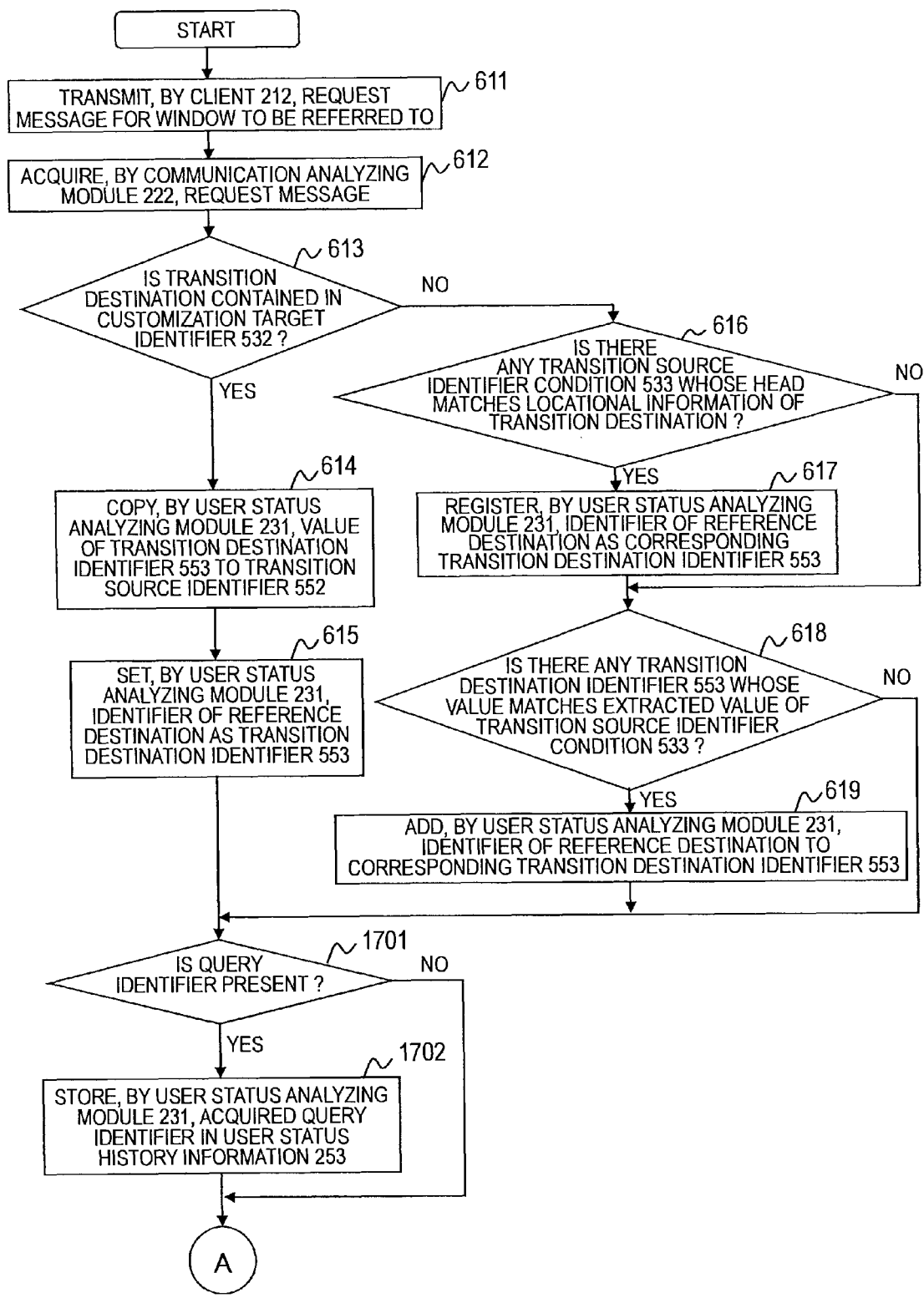
FIGS. 20A and 20B are flow charts illustrating processing procedures performed by a communication analyzing module according to the third embodiment of this invention.
Figure 20B:
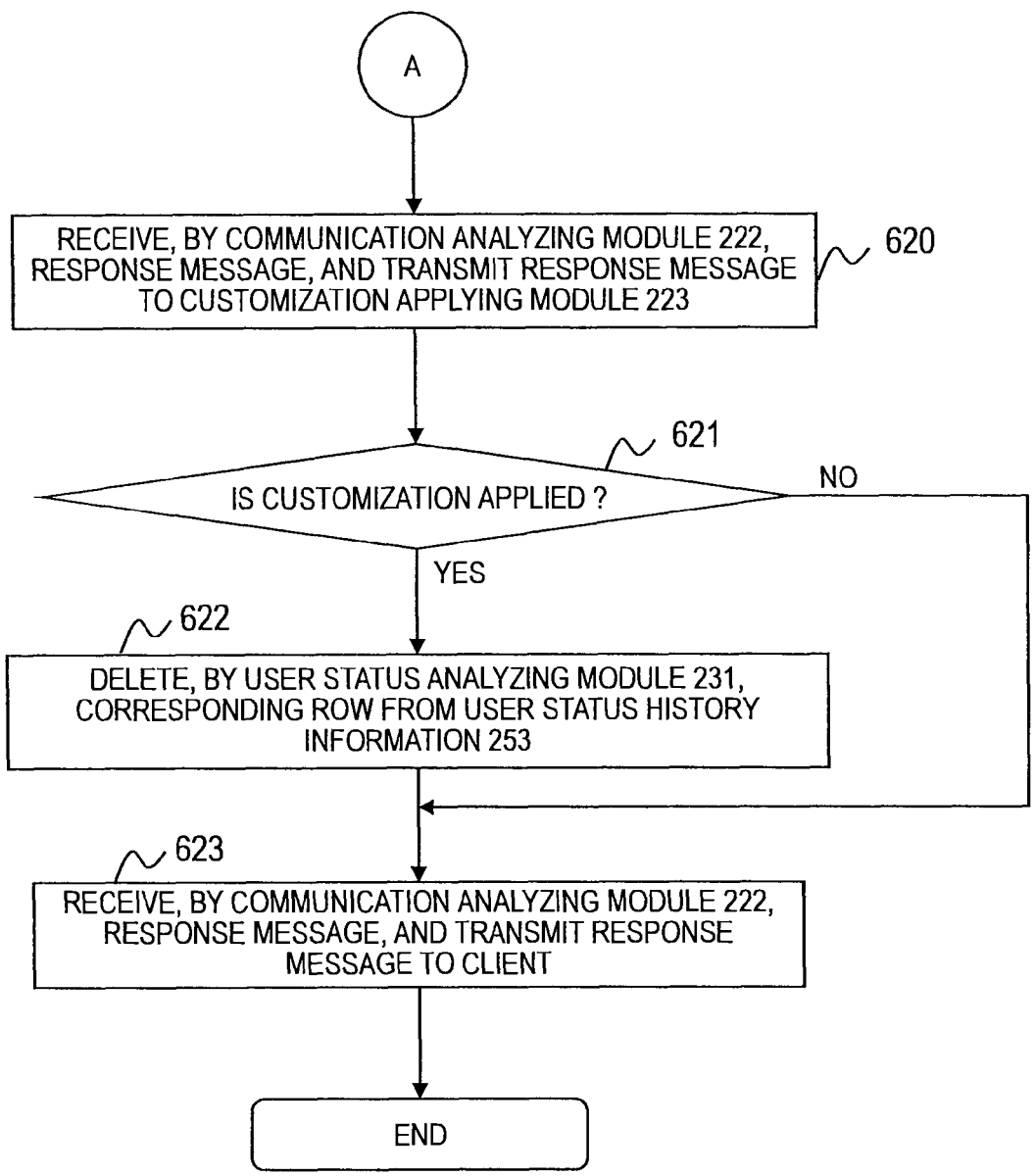

FIGS. 20A and 20B are flow charts illustrating processing procedures performed by the communication analyzing module 222 according to the third embodiment of this invention.

In the flow charts illustrated in FIGS. 20A and 20B, in addition to the processing illustrated in FIG. 6, processing of Steps 1701 and 1702 is newly added. It should be noted that processing from Steps 611 to 623 of FIGS. 20A and 20B is the same as the processing from Steps 611 to 623 of FIG. 6, and hence description thereof is omitted. Description is given of the processing of Steps 1701 and 1702.

The user status analyzing module 231 analyzes the structure of the request message acquired in the processing of Step 612, and then judges whether or not the query identifier is included in the request message (Step 1701). Then, in a case where the query identifier is included in the request message (the result of Step 1701 is "YES"), the user status analyzing module 231 executes processing of Step 1702. On the other hand, in a case where the query identifier is not included (the result of Step 1701 is "NO"), the user status analyzing module 231 executes the processing of Step 620.

The user status analyzing module 231 identifies, from the user status defining information for applying customization 252, a row in which a pair of the query identifier 1611 and the transition source identifier condition 533 have the same values as those of a pair of the query identifier and the locational information of the window, which have been acquired in the processing of Step 1701. Then, the user status analyzing module 231 acquires the customization ID 531 corresponding to the identified row to identify, in the user status history information 253, a row whose customization ID 551 has the same value as that of the customization ID 531, and then sets, in the query identifier 1621 of that row, the structure information acquired in the processing of Step 1701 (Step 1702).

<Flow of Processing Performed by Customization Applying Module>

Figure 21:
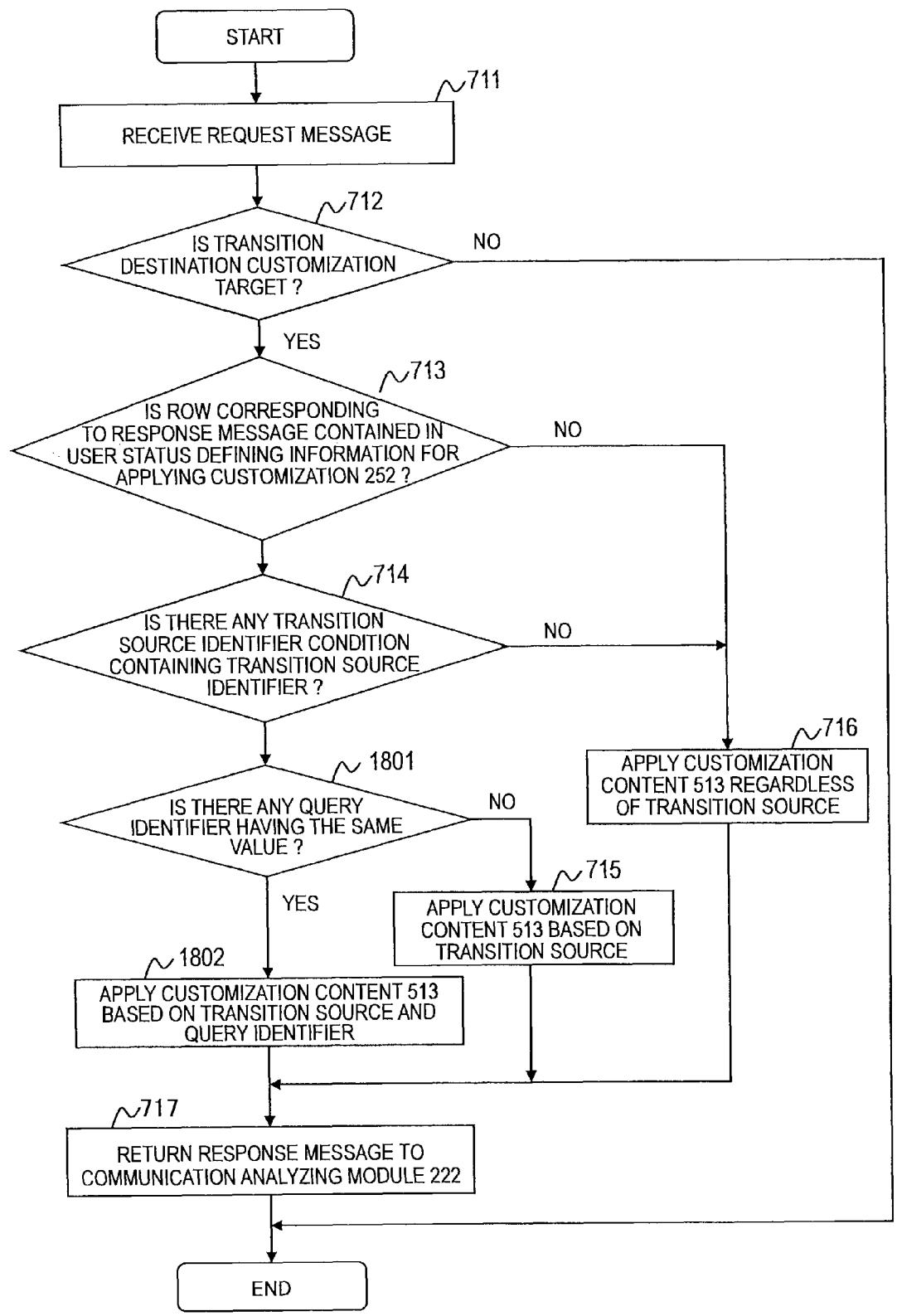
FIG. 21 is a flow chart illustrating processing procedures performed by a customization applying module according to the third embodiment of this invention.

FIG. 21 is a flow chart illustrating the processing procedures performed by the customization applying module 223 according to the third embodiment of this invention.

In the flow chart illustrated in FIG. 21, in addition to the processing illustrated in FIG. 7, processing of Steps 1801 and 1802 is newly added. It should be noted that processing from Steps 711 to 717 of FIG. 21 is the same as the processing from Steps 711 to 717 of FIG. 7, and hence description thereof is omitted. Description is given of the processing of Steps 1801 and 1802.

The user status judging module 241 judges whether or not the user status defining information for applying customization 252 includes a row whose transition source identifier condition 533 matches the transition source identifier 552 of the user status history information 253 acquired in the processing of Step 714 and whose query identifier 1611 matches the query identifier 1621 of the user status history information 253 (Step 1801). In a case where there is a row whose query identifier 1611 matches the query identifier 1621 (the result of Step 1801 is "YES"), the user status judging module 241 executes processing of Step 1802. In a case where there is no row whose query identifier 1611 matches the query identifier 1621 (the result of Step 1801 is "NO"), the user status judging module 241 executes the processing of Step 715.

The customization applying module 223 applies, to the response message, the customization content 513 included in the row of the customization defining information 251, whose customization ID 511 corresponds to the value acquired in the processing of Step 1801, thereby creating a new response message (Step 1802).

<Customization Definition>

Supplementary description is given of the method of setting the condition for applying customization according to the third embodiment of this invention.

Window history information 1951 according to the third embodiment of this invention further includes a query identifier generated in a case where the user performs an operation via a window provided by an application. As described above, the query identifier may be acquired from the HTTP header or the HTTP message body.

Further, in a case where it is difficult for the user to select a query identifier itself, the following configuration may be employed. Information for identifying an operation performed by the user is recorded in the window history information 1951, and, in a case where a query identifier is defined as the condition for applying customization, the content of the operation is presented to specify the query identifier.

<Effect>

According to the third embodiment of this invention, by adding a query identifier generated through an operation performed by the user as the condition for applying customization, it is possible to provide an application customized according to the task.

Here, in addition to the windows of the transition source and the transition destination and the structure information or the query identifier, as have been described in the first to third embodiments of this invention, information that is generated by the application server in response to a request from the client or managed by the application server may be set as the condition for applying customization. The information generated or managed by the application server includes, for example, log information that is output by the application operating on the application server and user profile information such as user's organization, hobby, gender, and age. Further, the condition for applying customization may be set by combining, with the information generated or managed by the application server, the windows of the transition source and the transition destination and the structure information or the query identifier, which are used as the conditions for applying customization in the first to third embodiments.

Figure 22:
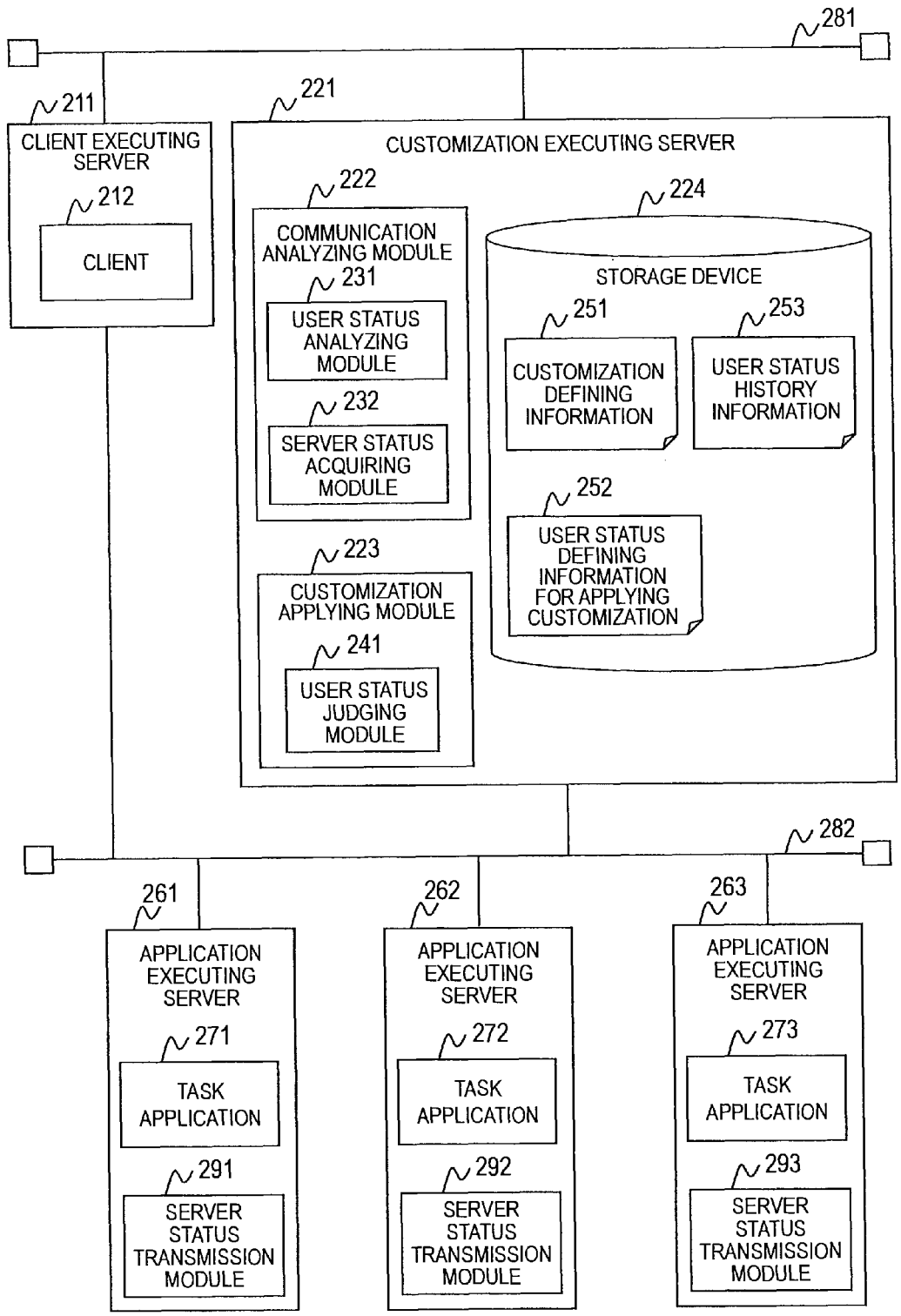
FIG. 22 is a block diagram illustrating an example of a configuration of a computer system that, in order to realize the above, uses a server status according to the first to third embodiments of this invention as a condition for changing an application.

FIG. 22 is a block diagram illustrating an example of the configuration of a computer system that, in order to realize the above, uses a server status according to this invention as a condition for changing an application.

In FIG. 22, in addition to the configuration of the computer system illustrated in FIG. 2, the communication analyzing module 222 is added with a server status acquiring module 232 for acquiring a server status, and the client executing server 211 and the network 282 are coupled to each other. In addition, the application executing servers 261, 262, and 263 are added with server status transmission modules 291, 292, and 293, respectively.

In the first to third embodiments, the customization executing server 221 acquires a request message from the client executing server 211 to the application executing server and a response message from the application executing server to the client executing server 211 between the client executing server 211 and the application executing server. Here, however, it is assumed that the customization executing server 221 acquires only a response message from the application executing server to the client executing server, and a request message from the client executing server 211 is directly transmitted to the application executing server without passing the customization executing server 221.

When the communication analyzing module 222 has acquired a response message of an application for which the client has given an instruction to execute, the server status acquiring module 232 makes a request for acquiring a server status to the application executing server that runs the application for which the instruction for execution has been given, and then acquires the server status from the application executing server. Then, the server status acquiring module 232 refers to the user status defining information for applying customization 252. In a case where the server status matches a content defined in the user status defining information for applying customization 252, the server status acquiring module 232 stores the acquired server status in the user status history information 253.

Here, information that indicates a server status to be acquired is defined in the user status defining information for applying customization 252. For example, a column that defines the server status is newly added to the user status defining information for applying customization 252 illustrated in FIG. 5B, and then a defined server status is stored in the column.

When a request message for acquiring the server status has been received from the customization executing server 221, each of the server status transmission modules 291, 292, and 293 returns a requested server status to the customization executing server 221. Here, the requested server status may be included in the request message for acquiring the server status, which is transmitted from the customization executing server 221. Alternatively, as the requested server status, a request content may be registered in advance in the application executing server from the customization executing server 221.

While the present invention has been described in detail and pictorially in the accompanying drawings, the present invention is not limited to such detail but covers various obvious modifications and equivalent arrangements, which fall within the purview of the appended claims.

What is claimed is:

1. An application executing method used for a computer system, the application executing method including the steps of:

receiving, by the customization executing server, a request message including a request for executing the application and the particular application from the client in a case where the client makes a request for the processing to the application and the particular application in order to process the task;

analyzing, by the customization executing server, the received request message to identify the operation information of the application and the particular application;

recording, by the customization executing server, based on the user status defining information for applying customization, the identified operation information in the user status information;

transmitting, by the customization executing server, the request message to the application server;

executing, by the application server, based on the request message, the processing for which the request is made;

transmitting, by the application server, a response message corresponding to the request message;

receiving, by the customization executing server, the response message transmitted by the application server;

judging, by the customization executing server, based on the user status defining information for applying customization and the user status information, which step of a process of processing the task is to be customized, and determining whether or not to change the particular application;

changing, by the customization executing server, in a case where the particular application is changed, the response message based on the customization defining information to newly generate a response message; and transmitting, by the customization executing server, the newly-generated response message to the client;

the application executing method performed by a customization executing server in a context of:

an application server for receiving a request from a client and providing an application for processing a task; and a customization executing server for changing a particular application included in the application and providing the changed particular application to the client, the customization executing server having:

an interface coupled to the client and the application server;

a processor coupled to the interface; and a memory accessible from the processor, the memory storing:

user status information including operation information of the application for processing the task and the particular application;

user status defining information for applying customization in which the operation information of the application executed before the particular application is requested to perform processing is defined as a condition for changing the particular application; and customization defining information in which a customization content for the particular application is defined.

2. The application executing method according to claim 1, wherein:
the user status defining information for applying customization includes, as the condition for changing the particular application, an execution order of the application; and
the application executing method further includes the step of recording, by the customization executing server, as the operation information of the application, an execution history of the application in the user status information.

3. The application executing method according to claim 2, wherein:
the user status defining information for applying customization further includes, as the condition for changing the particular application, information indicating a status of a transmission source of the request message; and
the application executing method further includes the step of recording, by the customization executing server, as the operation information of the application, the information indicating the status of the transmission source in the user status information.

4. The application executing method according to claim 2, wherein:
the request message includes a parameter for enabling the application for which the request for the executing is made to retrieve information;
the user status defining information for applying customization further includes the parameter as the condition for changing the particular application; and
the application executing method further includes the step of recording, by the customization executing server, as the operation information of the application, the parameter in the user status information.

5. The application executing method according to claim 1, further including the steps of:
recording, by the customization executing server, in a case where the request message is received, a history of operations requested by the client in the memory;
presenting, by the customization executing server, in a case where a request for changing the application is received from the client, the history of the operations, which is recorded in the memory, to the client; and
receiving, by the customization executing server, a setting of the user status defining information for applying customization.

6. An application changing apparatus that is coupled to an application server for receiving a request from a client and providing an application for processing a task, and changes a particular application included in the application and provides the changed particular application to the client, the application changing apparatus comprising:
an interface coupled to the client and the application server;
a processor coupled to the interface; and
a memory accessible from the processor, wherein:
the memory stores:
user status information containing operation information of the application for processing the task and the particular application;
user status defining information for applying customization in which the operation information of the application executed before the particular application is requested to perform processing is defined as a condition for changing the particular application; and
customization defining information in which a customization content for the particular application is defined; and
the processor is configured to:
receive a request message including a request for executing the application and the particular application from the client in a case where the client makes a request for the processing to the application and the particular application in order to process the task;
analyze the received request message to identify the operation information of the application and the particular application;
record, based on the user status defining information for applying customization, the identified operation information in the user status information;
transmit the request message to the application server;
receive a response message transmitted by the application server;
judge, based on the user status defining information for applying customization and the user status information, which step of a process of processing the task is to be customized, and determine whether or not to change the particular application;
change, in a case where the particular application is changed, the response message based on the customization defining information to newly generate a response message; and
transmit the newly-generated response message to the client.

7. The application changing apparatus according to claim 6, wherein:
the user status defining information for applying customization includes, as the condition for changing the particular application, an execution order of the application; and
the processor is configured to record, as the operation information of the application, an execution history of the application in the user status information.

8. The application changing apparatus according to claim 7, wherein:
the user status defining information for applying customization further includes, as the condition for changing the particular application, information indicating a status of a transmission source of the request message; and
the processor is configured to record, as the operation information of the application, the information indicating the status of the transmission source in the user status information.

9. The application changing apparatus according to claim 7, wherein:
the request message includes a parameter for enabling the application for which the request for execution is made to retrieve information;
the user status defining information for applying customization further includes the parameter as the condition for changing the particular application; and
the processor is configured to record, as the operation information of the application, the parameter in the user status information.

10. The application changing apparatus according to claim 6, wherein the processor is further configured to:
record, in a case where the request message is received, a history of operations requested by the client in the memory;
present, in a case where a request for changing the application is received from the client, the history of the operations, which is recorded in the memory, to the client; and
receive a setting of the user status defining information for applying customization.

11. A computer readable storage device recorded with an application changing program executed by a customization executing server for changing a particular application included in an application provided by an application server for processing a task and providing the changed particular application to a client, the application changing program controlling the customization executing server to execute the steps of:
    receiving a request message including a request for executing the application and the particular application from the client in a case where the client makes a request for processing to the application and the particular application in order to process the task;
    analyzing the received request message to identify the operation information of the application and the particular application;
    recording, based on the user status defining information for applying customization, the identified operation information in the user status information;
    transmitting the request message to the application server;
    receiving a response message transmitted by the application server;
    judging, based on the user status defining information for applying customization and the user status information, which step of a process of processing the task is to be customized, and determining whether or not to change the particular application;
    changing, in a case where the particular application is changed, the response message based on the customization defining information to newly generate a response message; and
    transmitting the newly-generated response message to the client;
    the customization executing server managing:
    user status information including operation information of the application for processing the task and the particular application, and information indicating a flow of operation;
    user status defining information for applying customization in which the operation information of the application executed before the particular application is executed is defined as a condition for changing the particular application; and
    customization defining information in which a customization content for the particular application is defined.

12. A computer readable storage device recorded with the application changing program according to claim 11, wherein:
    the user status defining information for applying customization includes, as the condition for changing the particular application, an execution order of the application; and
    the application changing program further controls the customization executing server to execute the step of identifying the operation information of the application, an execution history of the application is recorded in the user status information.

13. A computer readable storage device recorded with the application changing program according to claim 12, wherein:
    the user status defining information for applying customization further includes, as the condition for changing the particular application, information indicating a status of a transmission source of the request message; and
    the application changing program further controls the customization executing server to execute the step of identifying the operation information of the application, the information indicating the status of the transmission source is recorded in the user status information.

14. A computer readable storage device recorded with the application changing program according to claim 12, wherein:
    the request message includes a parameter for enabling the application for which the request for execution is made to retrieve information;
    the user status defining information for applying customization further includes the parameter as the condition for changing the particular application; and
    the application changing program further controls the customization executing server to execute the step of identifying the operation information of the application, the parameter is recorded in the user status information.

15. A computer readable storage device recorded with the application changing program according to claim 11, which further controls the customization executing server to execute the steps of:
    recording, in a case where the request message is received, a history of the operations requested by the client;
    outputting, in a case where a request for changing the application is received from the client, the recorded history of the operations; and
    receiving a setting of the user status defining information for applying customization.

\* \* \* \* \*